United States Patent
Choi et al.

(10) Patent No.: US 12,188,791 B2
(45) Date of Patent: Jan. 7, 2025

(54) SENSING DEVICE

(71) Applicant: LG INNOTEK CO., LTD., Seoul (KR)

(72) Inventors: Ho Min Choi, Seoul (KR); Sung Wook Byun, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 145 days.

(21) Appl. No.: 18/017,129

(22) PCT Filed: Jul. 12, 2021

(86) PCT No.: PCT/KR2021/008860
§ 371 (c)(1),
(2) Date: Jan. 20, 2023

(87) PCT Pub. No.: WO2022/039386
PCT Pub. Date: Feb. 24, 2022

(65) Prior Publication Data
US 2023/0266150 A1     Aug. 24, 2023

(30) Foreign Application Priority Data

Aug. 20, 2020  (KR) .................. 10-2020-0104743
Oct. 19, 2020  (KR) .................. 10-2020-0135236

(51) Int. Cl.
- *G01D 5/20* (2006.01)
- *B62D 15/02* (2006.01)
- *G01M 17/06* (2006.01)

(52) U.S. Cl.
CPC .......... *G01D 5/2013* (2013.01); *G01M 17/06* (2013.01); *B62D 15/02* (2013.01)

(58) Field of Classification Search
CPC ...... G01D 5/2013; G01D 5/145; G01D 5/147; G01M 17/06
See application file for complete search history.

(56) References Cited

U.S. PATENT DOCUMENTS

| | | |
|---|---|---|
| 4,841,246 A | 6/1989 | Juds et al. |
| 2004/0164727 A1* | 8/2004 | Lin .................. G01D 5/145 324/207.2 |
| 2007/0194784 A1 | 8/2007 | Perini |

FOREIGN PATENT DOCUMENTS

| | | |
|---|---|---|
| JP | 2014-134535 | 7/2014 |
| KR | 10-2004-0085162 | 10/2004 |
| KR | 10-2015-0130295 | 11/2015 |

OTHER PUBLICATIONS

International Search Report dated Oct. 15, 2021 issued in Application No. PCT/KR2021/008860.

* cited by examiner

*Primary Examiner* — Minh Q Phan
(74) *Attorney, Agent, or Firm* — KED & ASSOCIATES, LLP

(57) ABSTRACT

An embodiment provides a sensing device comprising: a magnet; a first collector disposed to correspond to a path along which the magnet moves; and a first sensor disposed at one side of the first collector, wherein the first collector comprises a first leg part and a second leg part, the first leg part and the second leg part each comprise a facing surface disposed to face the magnet, and the sensing device comprises an area in which a gap between the first leg part and the second leg part increases along a direction from one side toward the other side thereof or an area in which the facing surface of each of the first leg part and the second leg part has a width decreasing along a direction from one side toward the other side thereof. Accordingly, the sensing device can reduce an effect of an external magnetic field to improve sensing accuracy.

20 Claims, 22 Drawing Sheets

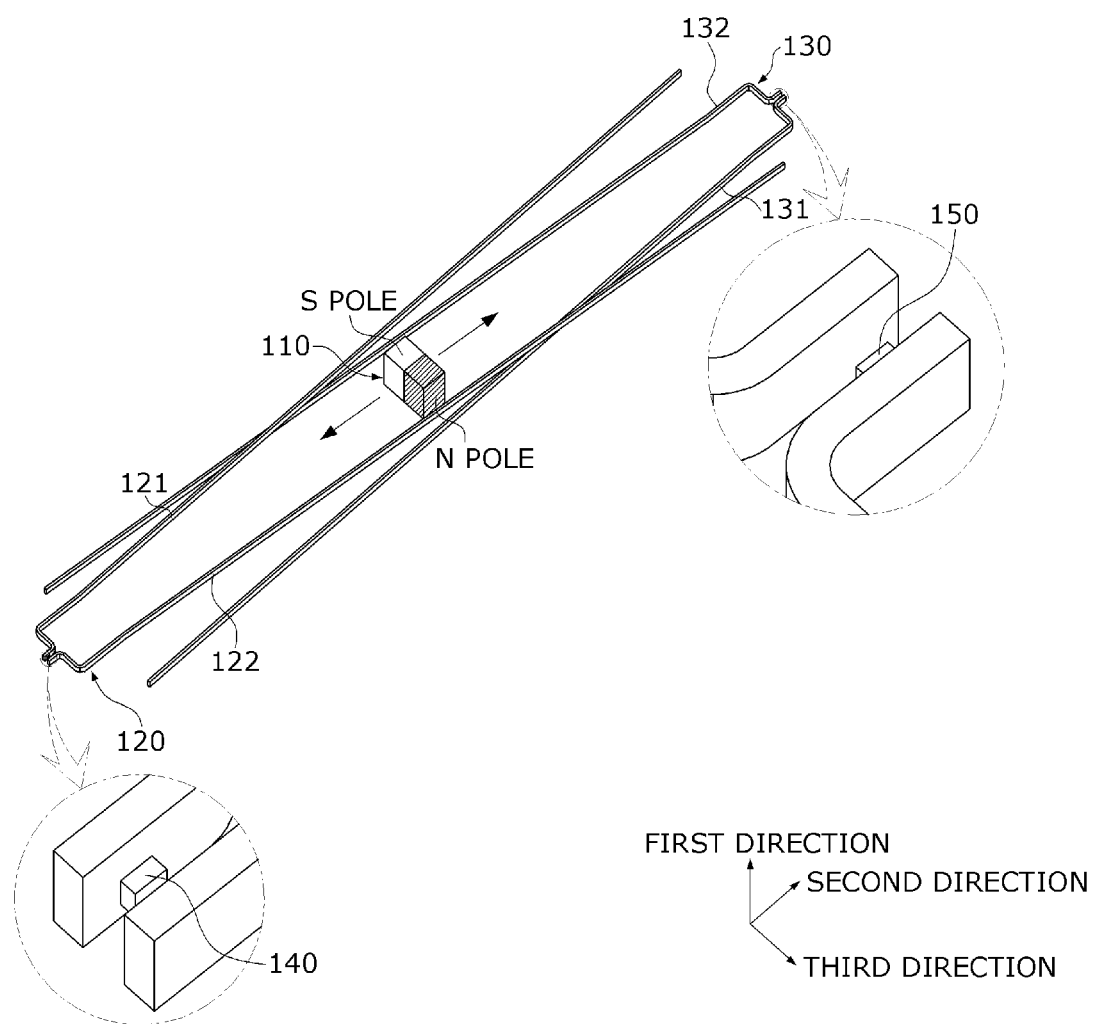
[FIG. 1]

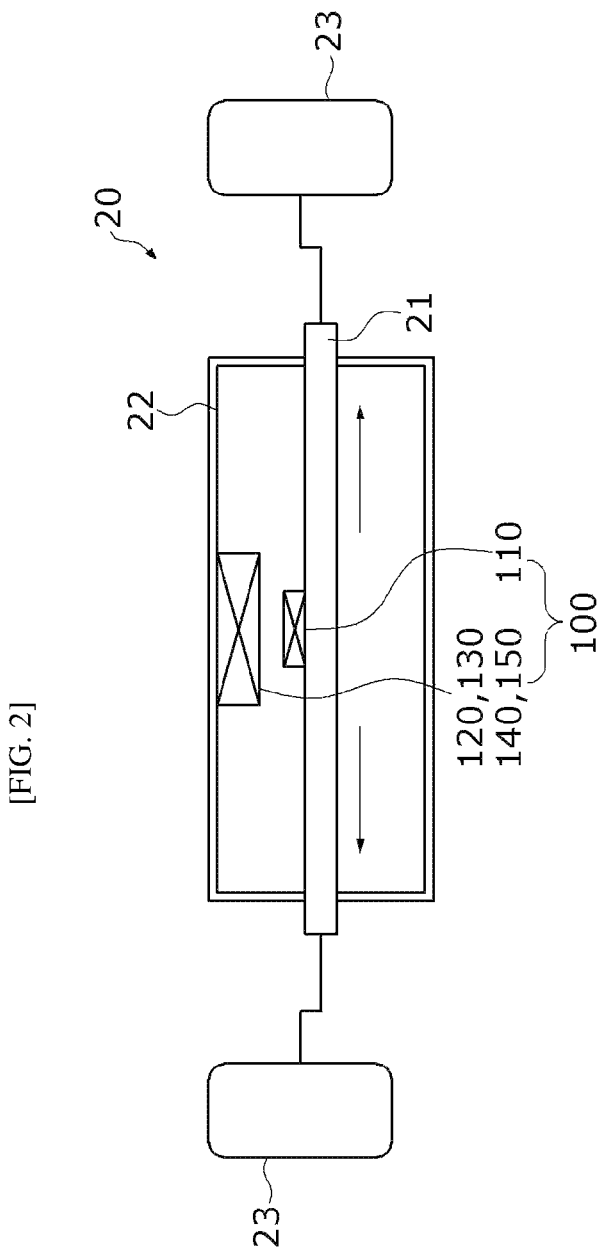
[FIG. 2]

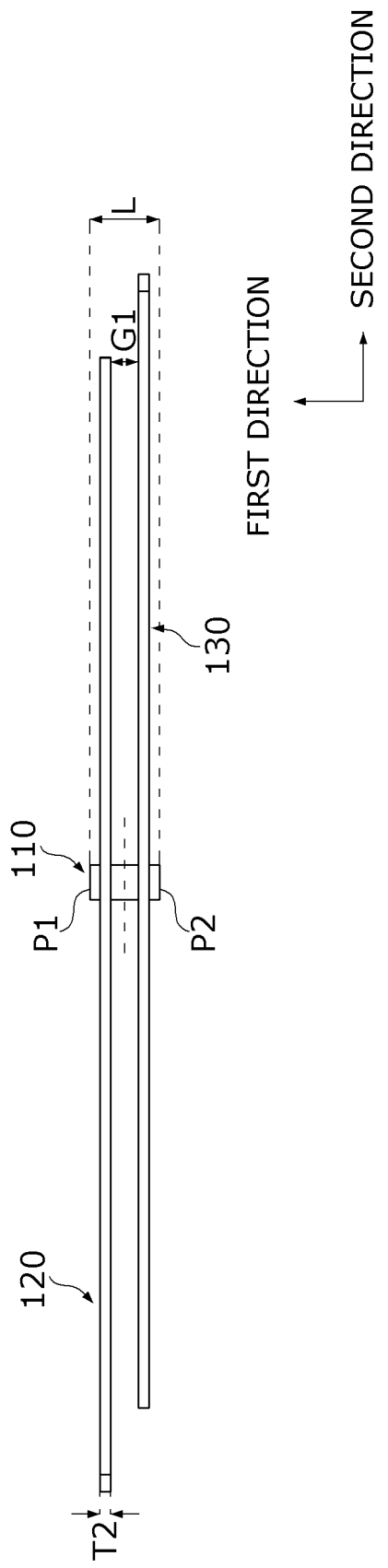

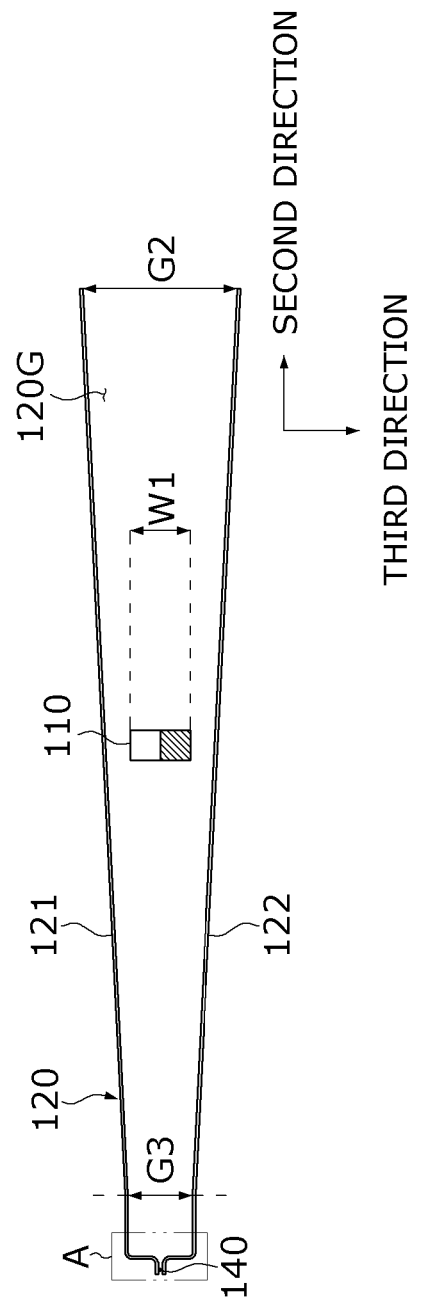

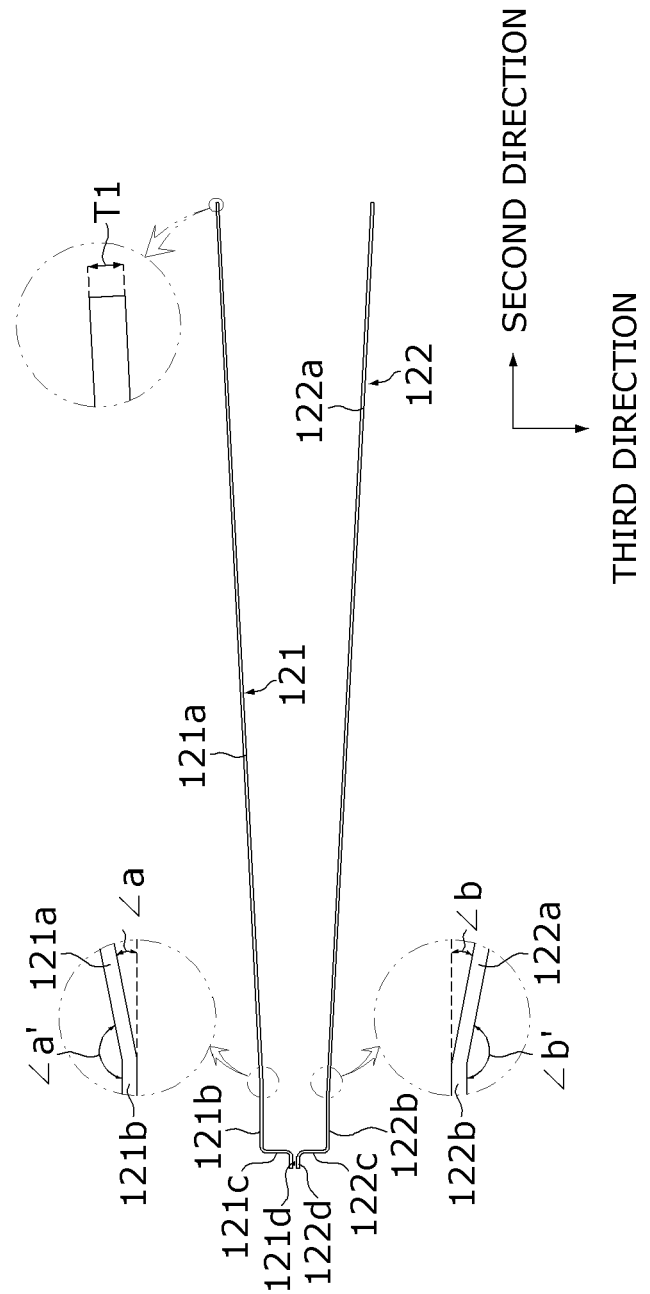

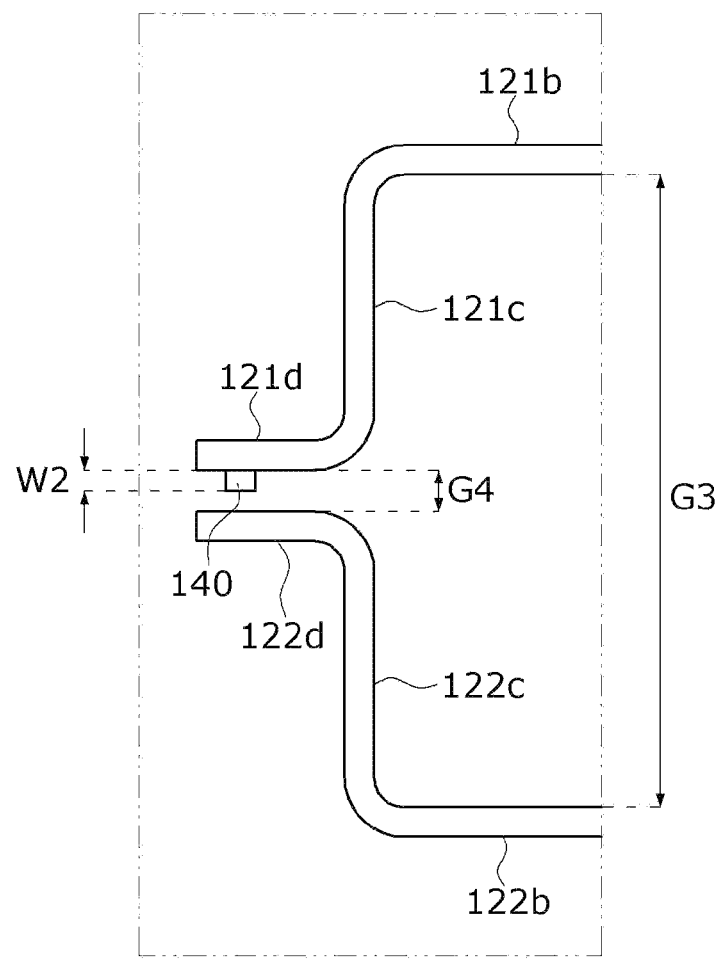
[FIG. 6]

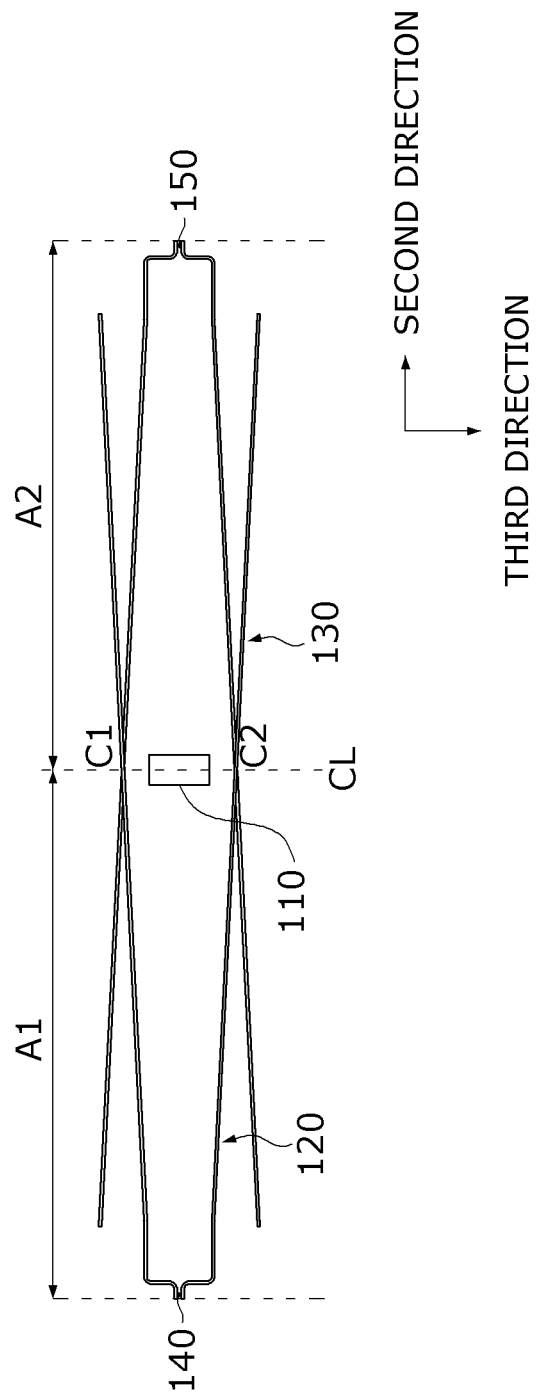
[FIG. 7]

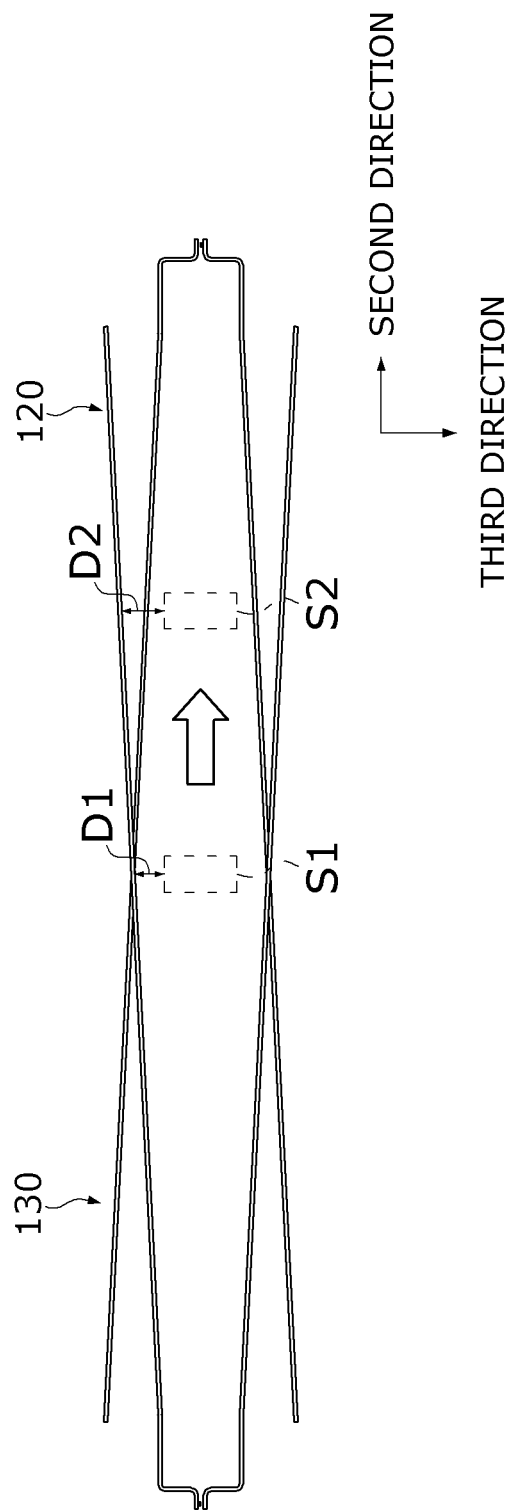
[FIG. 8]

[FIG. 9]
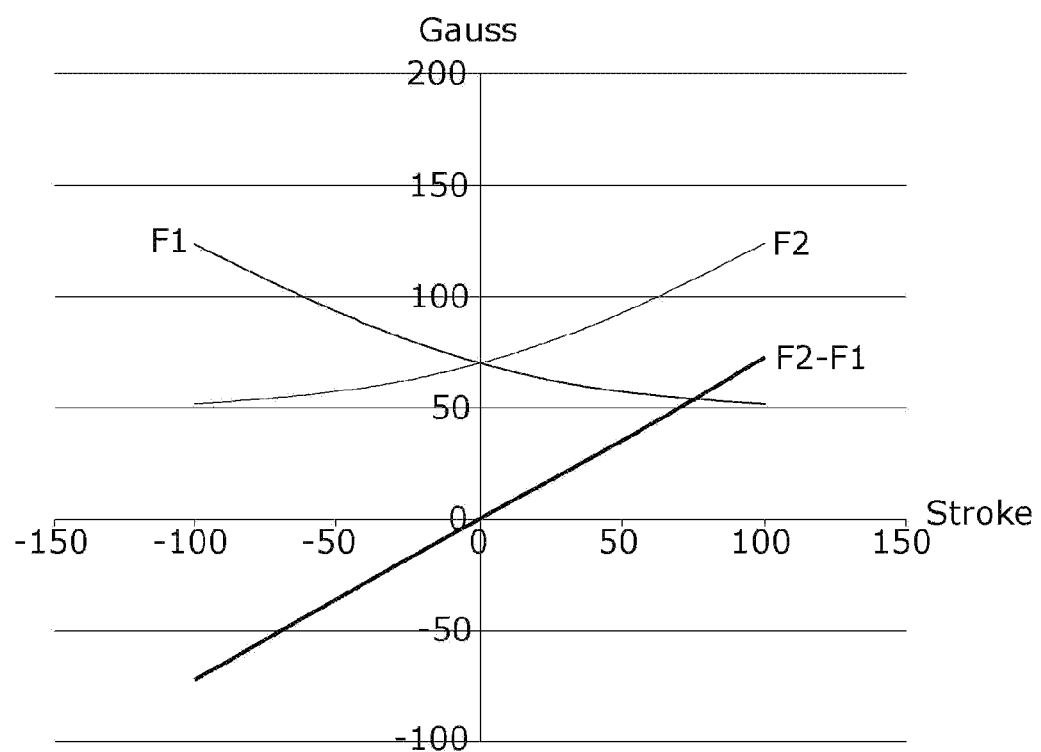

[FIG. 10]
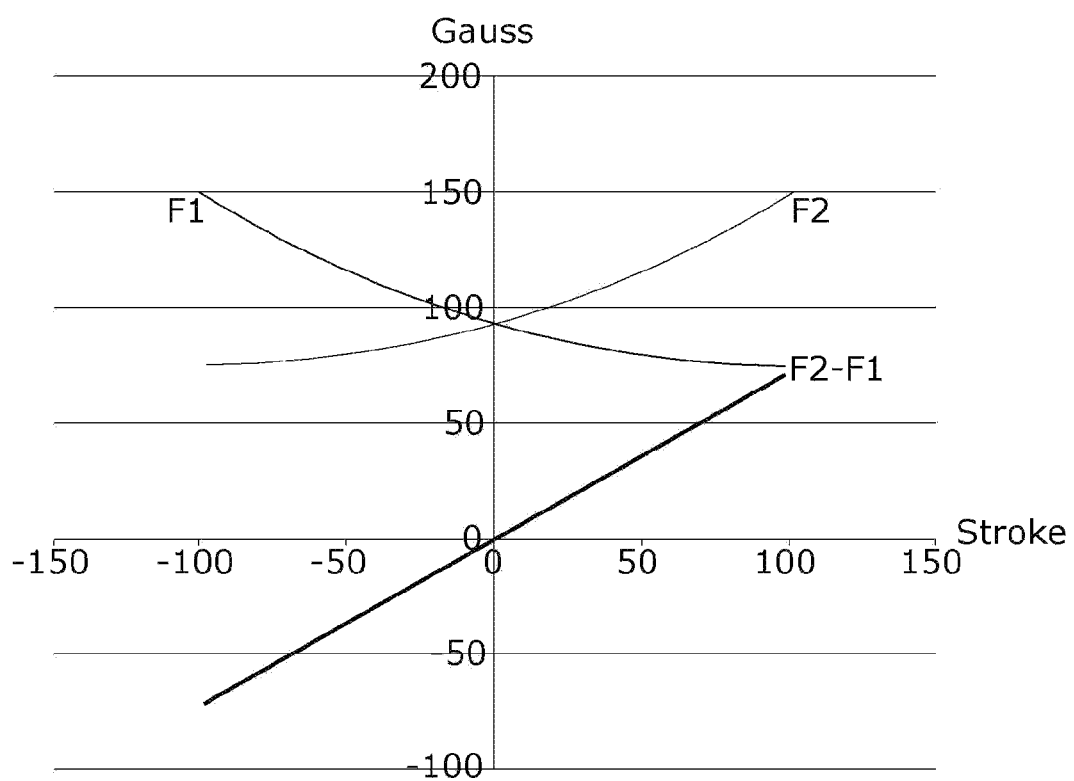

[FIG. 11]
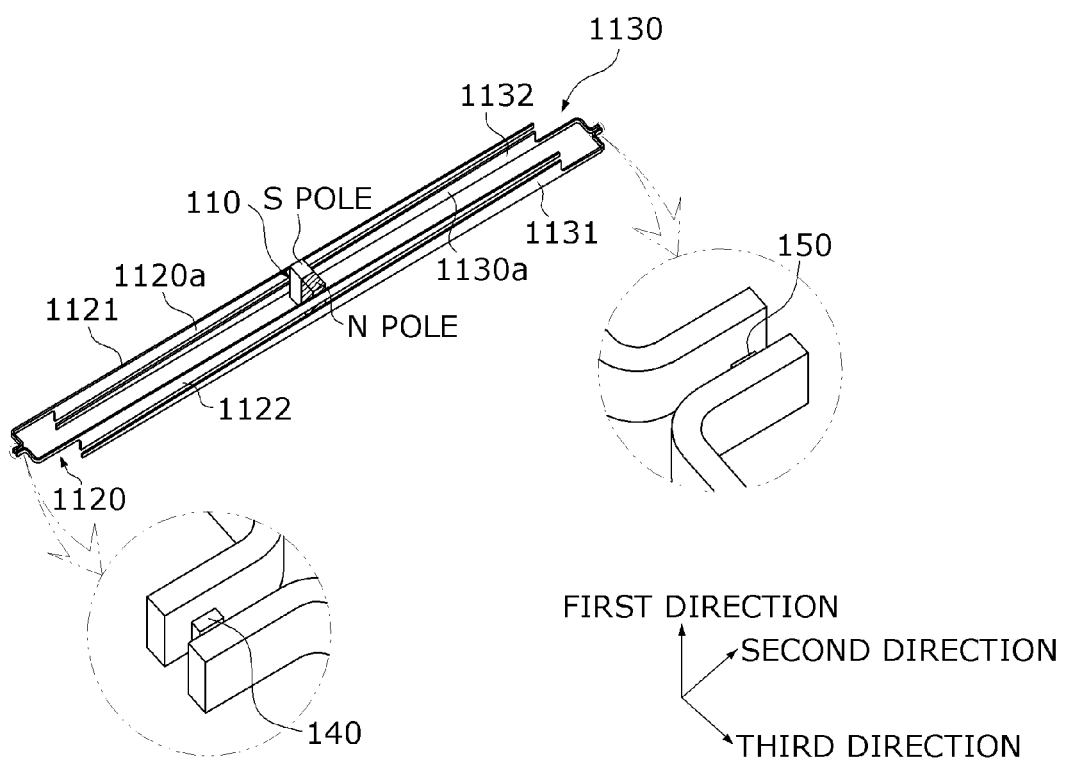

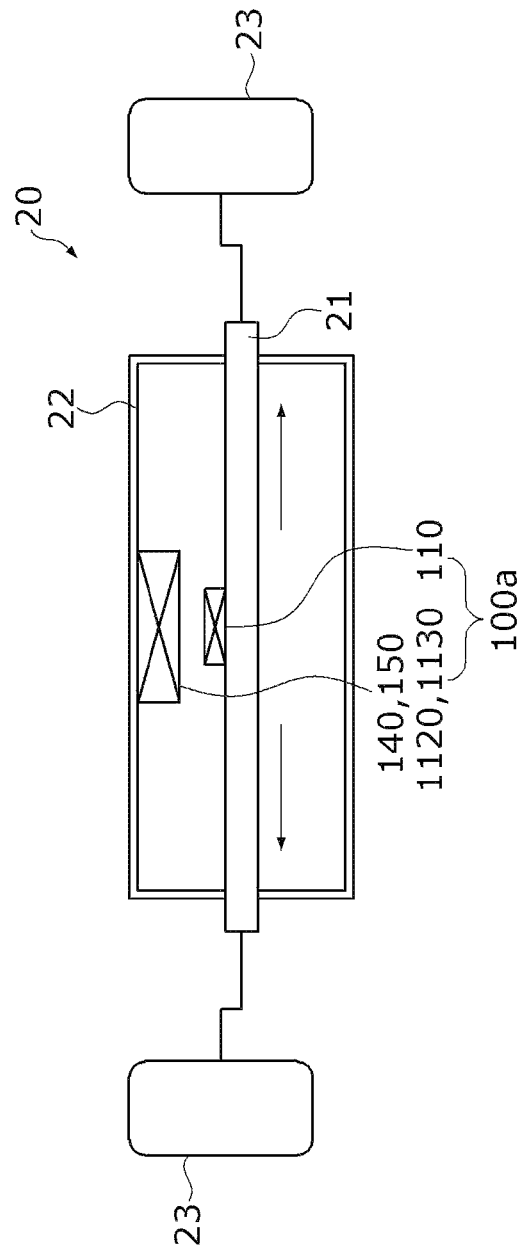
[FIG. 12]

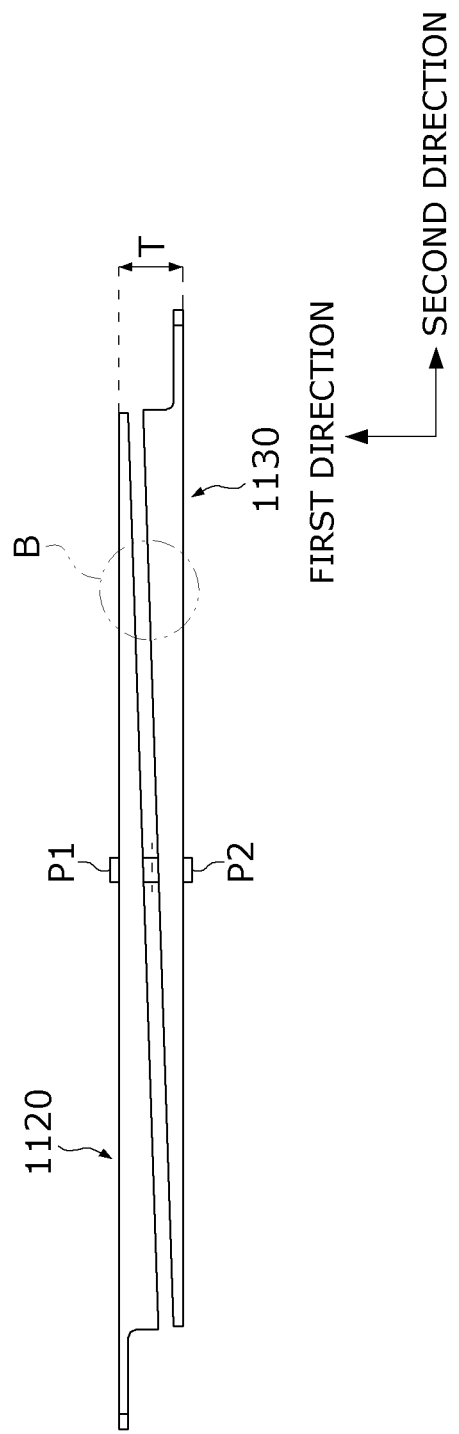

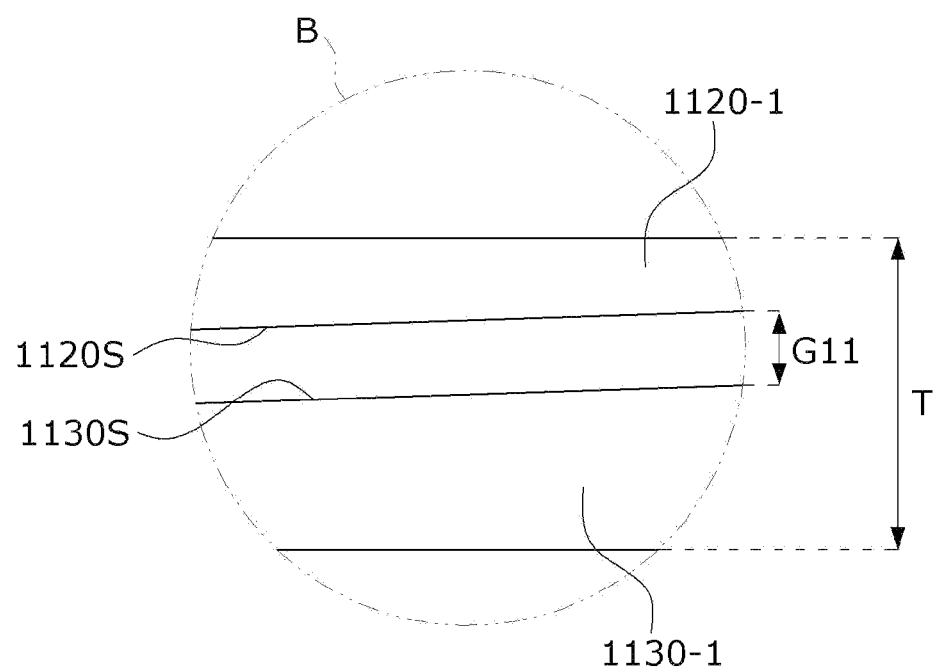
[FIG. 14]

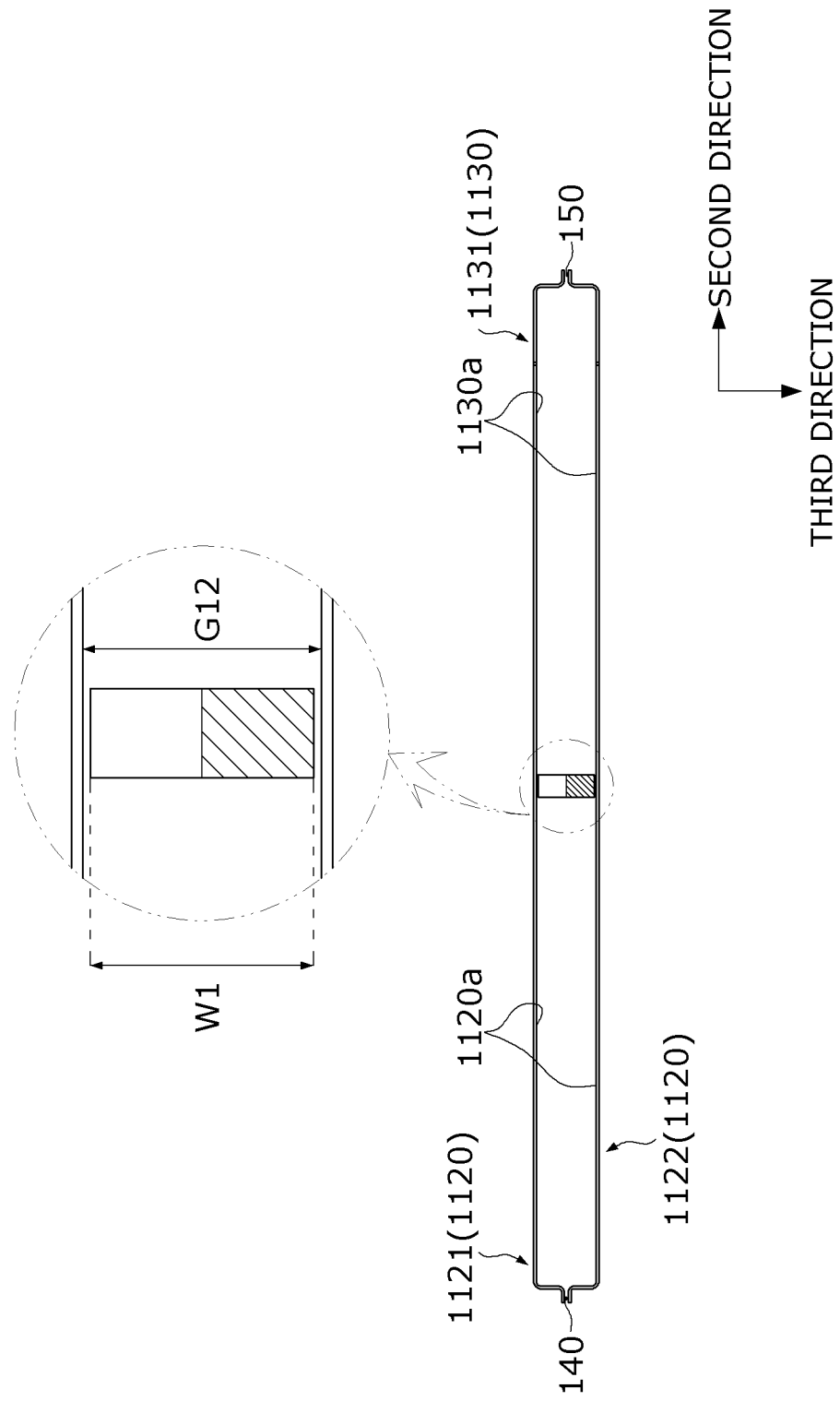

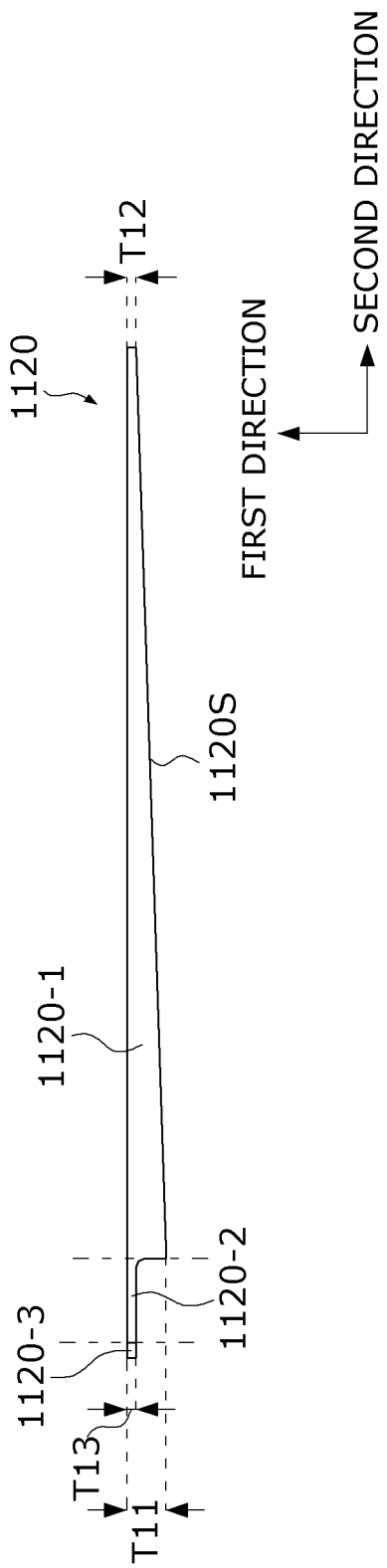

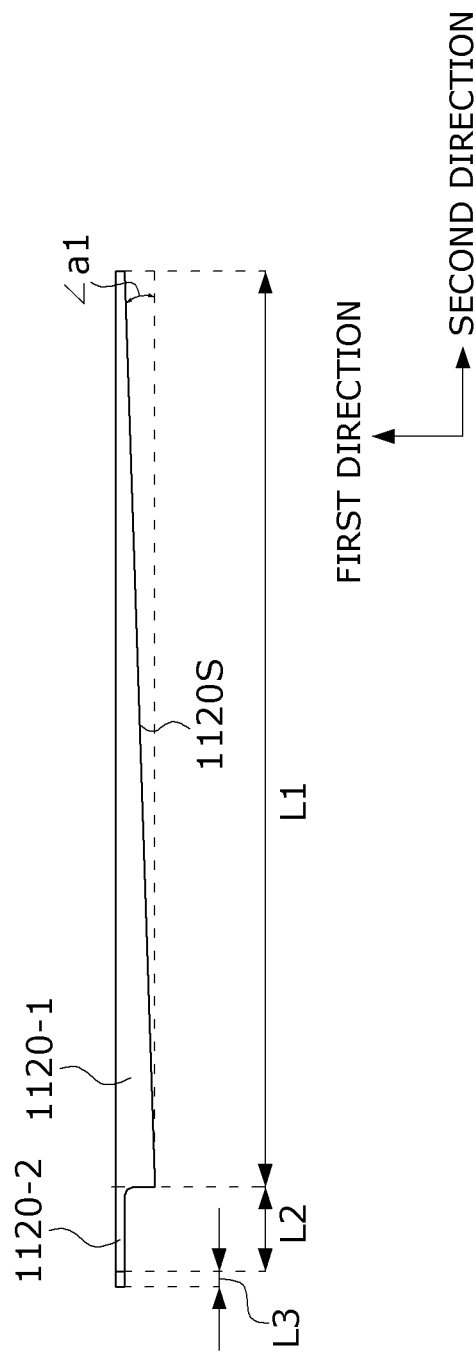

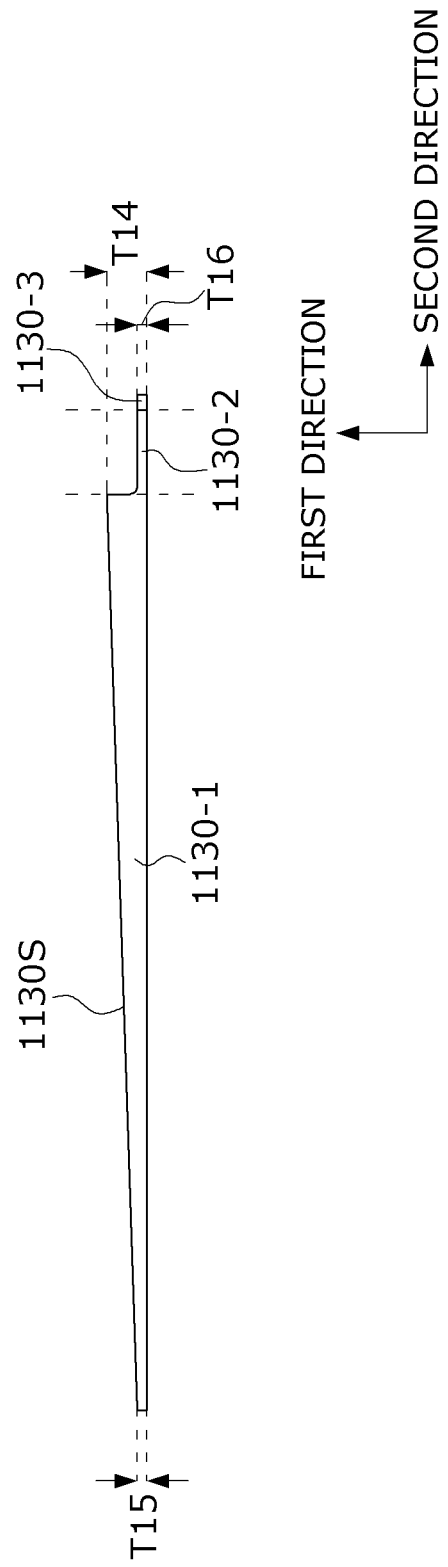

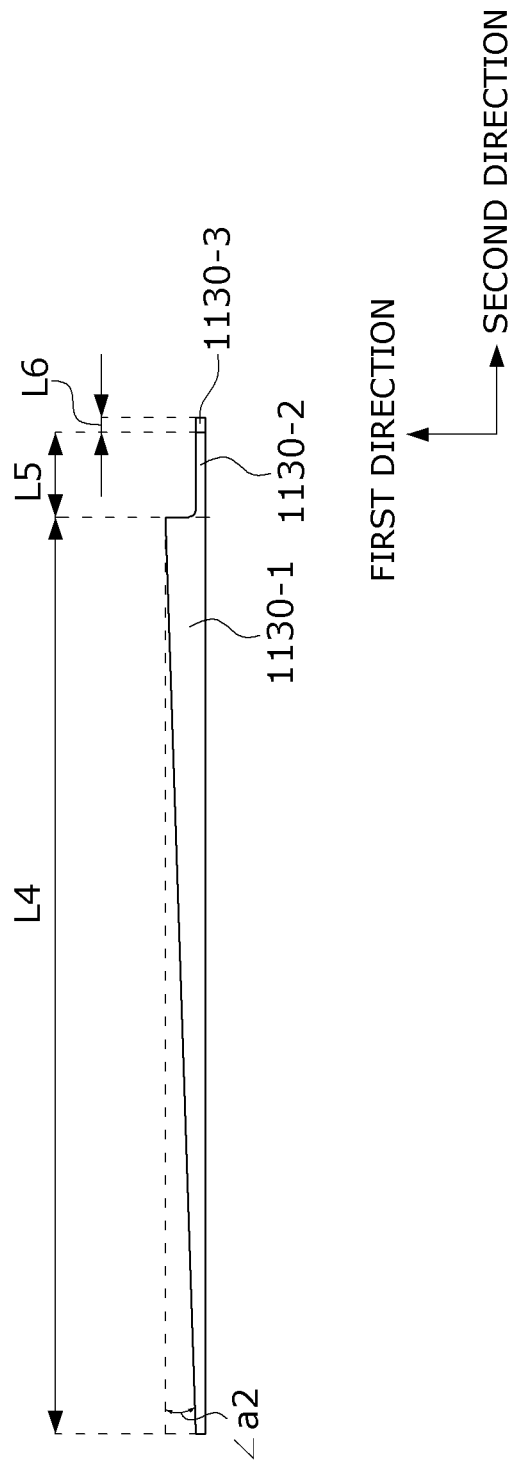
[FIG. 19]

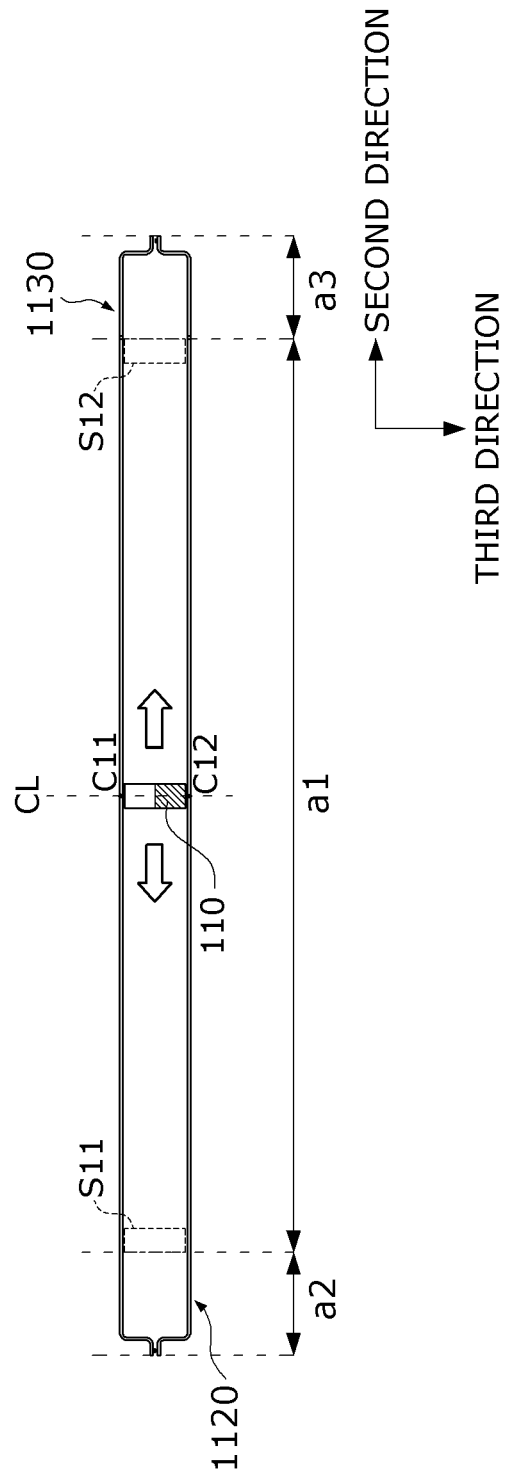

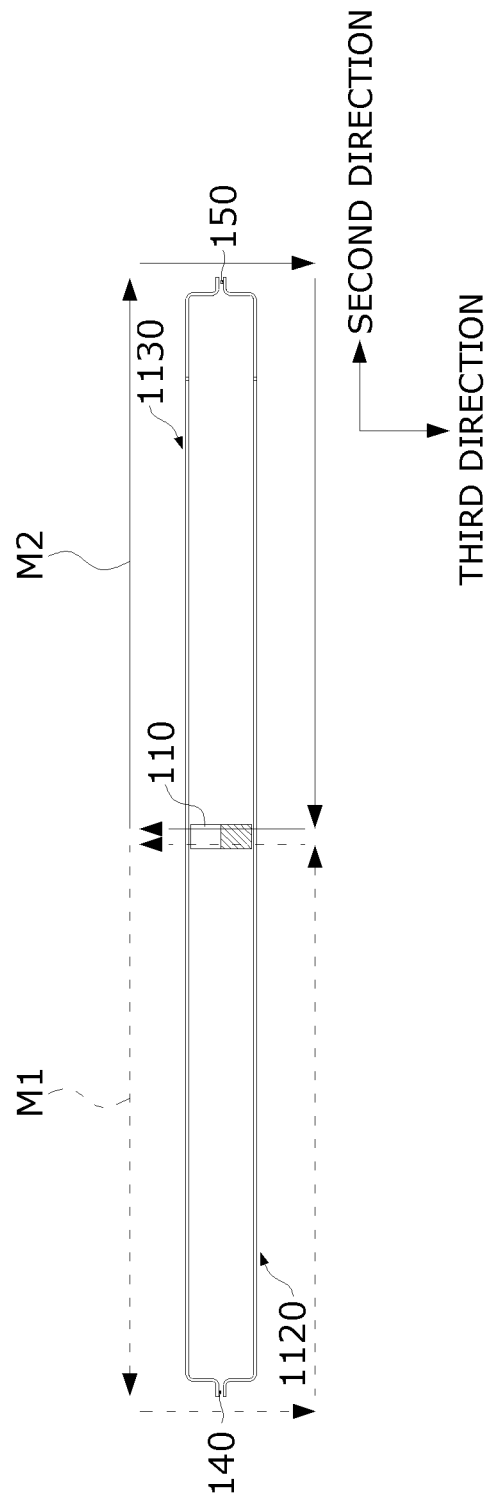

[FIG. 22]
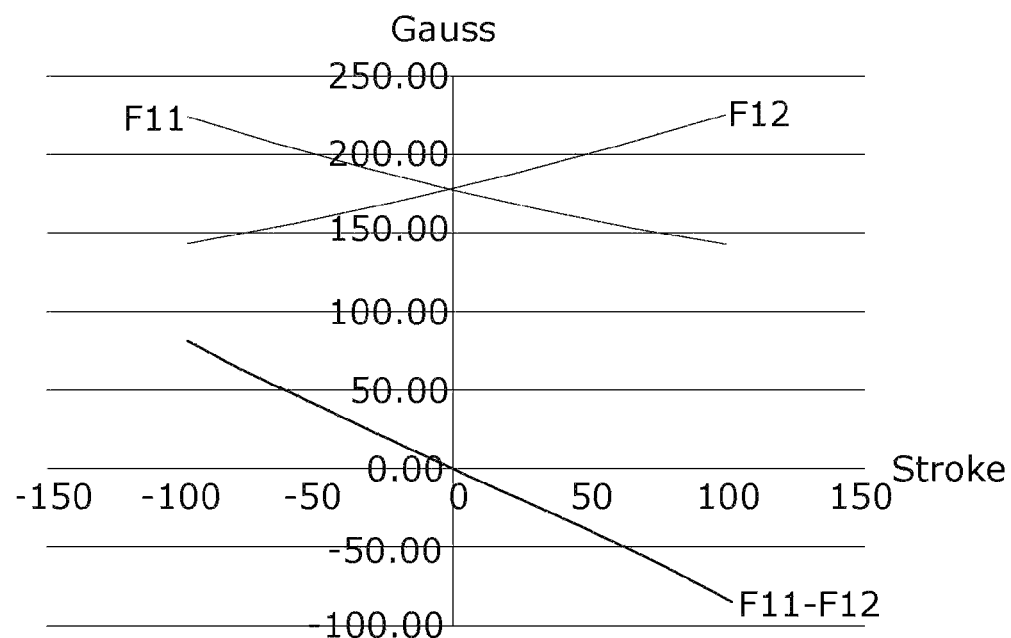
[FIG. 23]
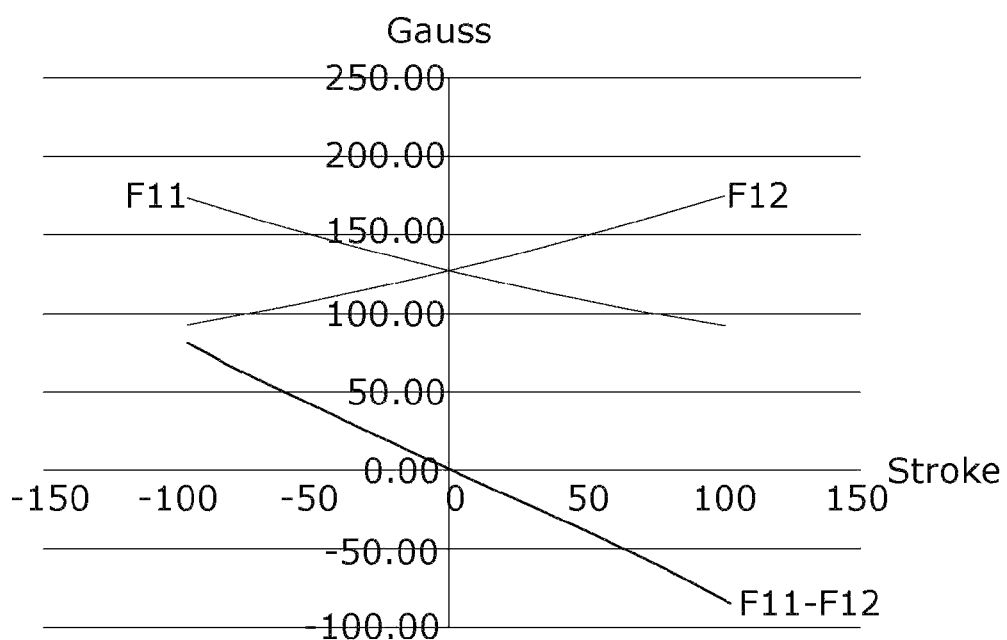

SENSING DEVICE

CROSS-REFERENCE TO RELATED PATENT APPLICATIONS

This application is a U.S. National Stage Application under 35 U.S.C. § 371 of PCT Application No. PCT/KR2021/008860, filed Jul. 12, 2021, which claims priority to Korean Patent Application Nos. 10-2020-0104743, filed Aug. 20, 2020 and 10-2020-0135236, filed Oct. 19, 2020, whose entire disclosures are hereby incorporated by reference.

TECHNICAL FIELD

The present invention relates to a sensing device.

BACKGROUND ART

An electric power steering structure includes a rack bar which converts rotational motion of an input shaft into linear motion and transmits the linear motion to wheels of a vehicle. In addition, the electric power steering structure includes a sensing device which detects a position of the rack bar to measure a steering angle.

The sensing device includes a magnet mounted on the rack bar, a tube through which the magnet passes, and a plurality of coils wound around the tube. In addition, the sensing device can detect the position of the rack bar using an inductive magnetic field between the coils and the magnet. However, in the sensing device, there are problems that a phenomenon of a nonlinear change in magnetic flux density occurs, and the manufacturing costs increase because of many components.

Technical Problem

The present invention is directed to providing a sensing device which improves a degree of sensing accuracy by reducing magnetic leakage and an influence of an external magnetic field and of which components are simple.

Technical Solution

One aspect of the present invention provides a sensing device including a magnet, a first collector disposed to correspond to a path through which the magnet moves, and a first sensor disposed at one side of the first collector, wherein the first collector includes a first leg part and a second leg part, and a gap between the first leg part and the second leg part includes a region in which a size of the gap increases from one side toward the other side.

Another aspect of the present invention provides a sensing device including a magnet, a first collector and a second collector disposed to correspond to a path through which the magnet moves, a first sensor disposed on the first collector, and a second sensor disposed on the second collector, wherein the first sensor and the second sensor are disposed at opposite sides with respect to the magnet, the magnet includes a first part and a second part disposed in one direction, the first collector is disposed adjacent to the first part of the magnet, the second collector is disposed adjacent to the second part of the magnet, and a gap between the first collector and the second collector is smaller than a height of the magnet in the a third direction. In this case, the one direction in which the first part and the second part are disposed may be a direction or a first direction in which the first collector and the second collector are disposed to be spaced apart from each other to have a predetermined gap.

Still another aspect of the present invention provides a sensing device including a magnet, a first collector disposed around an upper end portion of the magnet, and a second collector disposed around a lower end portion of the magnet, wherein a position of the magnet is determined through a difference between a position of the magnet detected using the first collector and a position of the magnet detected using the second collector.

The sensor device may include a second sensor disposed at one side of the second collector, wherein the second collector may include a third leg part and a fourth leg part, and a gap between the third leg part and the fourth leg part may include a region in which a size of the gap increases from one side of the second sensor toward the other side.

The sensing device may include a second collector disposed adjacent to the first collector and a second sensor disposed at one side of the second collector, wherein the second collector may include a third leg part and a fourth leg part, the gap between the first leg part and the second leg part may include a region in which the size of the gap increases from the first sensor toward the second sensor, and a gap between the third leg part and the fourth leg part may include a region in which a size of the gap increases from the second sensor toward the first sensor.

The first collector and the second collector may be symmetrically disposed at one side and the other side with respect to the magnet, respectively.

The first sensor may be disposed between the first leg part and the second leg part.

Each of the first leg part and the second leg part may be disposed to have a predetermined inclination angle with respect to a direction of movement of the magnet.

The inclination angle may be in the range of 1 to 10 degrees.

A direction from an N pole toward an S pole of the magnet may be perpendicular to the first direction, and the direction from the N pole toward the S pole of the magnet may be perpendicular to the direction of movement of the magnet.

A position of the magnet may be detected through a difference between a magnetic flux density detected using the first collector and a magnetic flux density detected using the second collector.

The sensing device may include a first sensor and a second sensor, wherein the position of the magnet may be detected through a difference between a magnetic flux density of the magnet detected by the first sensor and a magnetic flux density of the magnet detected by the second sensor.

The sensing device may include a first sensor and a second sensor, wherein an initial position of the magnet may be a center between the first sensor and the second sensor, and a distance from the initial position to the first collector may increase when viewed from above.

A shortest distance between the magnet and the first collector may increase from the initial position in a direction opposite to the first sensor.

Each of the first leg part and the second leg part may include a facing surface disposed to face the magnet, and the facing surface of each of the first leg part and the second leg part may include a region in which a width of the facing surface decreases from one side toward the other side.

Yet another aspect of the present invention provides a sensing device including a magnet, a first collector disposed to correspond to a path through which the magnet moves, and a first sensor disposed at one side of the first collector, wherein the first collector includes a first leg part and a second leg part, each of the first leg part and the second leg part includes a facing surface disposed to face the magnet, and the facing surface of each of the first leg part and the facing surface of the second leg part includes a region of which a width of the facing surface decreases from one side toward the other side.

Yet another aspect of the present invention provides a sensing device including a magnet, a first collector and a second collector disposed to correspond to a path through which the magnet moves, a first sensor disposed on the first collector, and a second sensor disposed on the second collector, wherein the first sensor and the second sensor are disposed at opposite sides with respect to the magnet, the magnet includes a first part and a second part disposed in a third direction, the first collector is disposed adjacent to the first part of the magnet, the second collector is disposed adjacent to the second part of the magnet, the first collector has a first thickness in the third direction, the second collector has a second thickness in the third direction, the first collector includes a region in which the first thickness decreases from one side toward the other side, the second collector includes a region in which the second thickness increases as much as a decrease in the first thickness, and a gap between the first collector and the second collector is smaller than a height of the magnet in the third direction.

Yet another aspect of the present invention provides a sensing device including a magnet, a first collector disposed around an upper end portion of the magnet, and a second collector disposed around a lower end portion of the magnet, wherein the first collector includes a first surface facing the upper end portion of the magnet, a width of the first surface constantly decreases in a direction of movement of the magnet, the second collector includes a second surface facing the lower end portion of the magnet, a width of the second surface constantly increases in the direction of movement of the magnet, and a position of the magnet is determined through a difference between a position of the magnet detected using the first collector and a position of the magnet detected using the second collector.

The sensing device may include a second collector disposed adjacent to the first collector and a second sensor disposed at one side of the second collector, wherein the second collector may include a third leg part and a fourth leg part with the magnet interposed therebetween, each of the third leg part and the fourth leg part may include a facing surface disposed to face the magnet, and the facing surface of each of the third leg part and the fourth leg part may include a region in which a width of the facing surface increases from one side toward the other side.

The width of the facing surface of each of the first leg part and the second leg part may decrease at a constant rate, and the width of the facing surface of each of the third leg part and the fourth leg part may increase as much as a decrease in the width of the facing surface of each of the first leg part and the second leg part.

The sensing device may include a first sensor disposed on the first collector and a second sensor disposed on the second collector, wherein the facing surface of each of the first leg part and the second leg part may include a region in which the width of the facing surface decreases from the first sensor toward the second sensor, and the facing surface of each of the third leg part and the fourth leg part may include a region in which the width of the facing surface increases from the second sensor toward the first sensor.

The sensing device may include a first sensor disposed on the first collector and a second sensor disposed on the second collector, wherein the facing surface of each of the first leg part and the second leg part may include a region in which the width of the facing surface decreases from the first sensor toward the second sensor, and the facing surface of each of the third leg part and the fourth leg part may include a region in which the width of the facing surface decreases from the second sensor toward the first sensor.

The first collector and the second collector may be symmetrically disposed at one side and the other side with respect to an initial position of the magnet, respectively.

A sum of the first thickness and the second thickness in the direction of movement of the magnet may be constant.

The first thickness and the second thickness may be the same at a midpoint between the first sensor and the second sensor.

The first collector may include a first inclined surface which is formed on a surface facing the second collector and has a predetermined inclination angle with respect to a direction of movement of the magnet, and the second collector may include a second inclined surface which faces the first inclined surface and has predetermined inclination with respect to the direction of movement of the magnet.

The first inclined surface may have a first inclination angle with respect to the direction of movement of the magnet, the second inclined surface may have a second inclination angle with respect to the direction of movement of the magnet, and the first inclination angle and the second inclination angle may be disposed in opposite directions.

Each of the first inclination angle and the second inclination angle may be in the range of 1 to 5 degrees.

A position of the magnet may be detected through a difference between a magnetic flux density detected using the first collector and a magnetic flux density detected using the second collector.

The sensing device may include a first sensor and a second sensor, wherein the position of the magnet may be detected through the difference between the magnetic flux density of the magnet detected by the first sensor and the magnetic flux density of the magnet detected by the second sensor.

The sensing device may include a first sensor and a second sensor, wherein an initial position of the magnet may be a center between the first sensor and the second sensor, and, as the magnet moves from the initial position of the magnet, the width of the first surface facing the magnet may decrease constantly, and the width of the second surface facing the magnet may increase constantly.

Even when the magnet moves from the initial position of the magnet, the sum of the width of the first face and the width of the second face may be constant.

The first collector may include a pair of first portions between which the magnet moves, a pair of third parts between which the first sensor is disposed, and a pair of second portions connecting the pair of first portions and the pair of third portions.

Each of the first portions may have a maximum thickness and a minimum thickness, and the maximum thickness of the first portion may be greater than a thickness of each of the second portions and the third portions.

A distance between the pair of third portions may be smaller than a distance between the pair of first portions.

The distance between the pair of first portions may be greater than a width of the magnet, and the distance between the pair of third portions may be greater than a width of the first sensor.

A gap between the first leg part and the second leg part may include a region in which a size of the gap increases from one side toward the other side.

Advantageous Effects

The sensing device according to an embodiment can improve a degree of sensing accuracy by reducing magnetic leakage and an influence of an external magnetic field.

In addition, manufacturing costs of a sensing device can be reduced by simplifying components.

DESCRIPTION OF DRAWINGS

FIG. 1 is a perspective view illustrating a sensing device according to a first embodiment.

FIG. 2 is a schematic view illustrating a state in which the sensing device according to the first embodiment is installed in a vehicle steering structure.

FIG. 3 is a side view illustrating the sensing device according to the first embodiment.

FIG. 4 is a plan view illustrating a first collector, a first sensor, and a magnet of the sensing device according to the first embodiment.

FIG. 5 is a plan view illustrating a first leg part, a second leg part, and a first sensor of the first collector disposed in the sensing device according to the first embodiment.

FIG. 6 is an enlarged view illustrating portion A in FIG. 4.

FIG. 7 is a plan view illustrating the sensing device according to the first embodiment.

FIG. 8 is a plan view showing movement of the magnet in the sensing device according to the first embodiment.

FIG. 9 is a graph showing a result of measuring a magnetic flux density using the sensing device according to the first embodiment in a state in which an external magnetic field is not introduced into the sensing device.

FIG. 10 is a graph showing a result of measuring a magnetic flux density using the sensing device according to the first embodiment in a state in which an external magnetic field is introduced into the sensing device.

FIG. 11 is a perspective view illustrating a sensing device according to a second embodiment.

FIG. 12 is a schematic view illustrating a state in which the sensing device according to the second embodiment is installed in a vehicle steering structure.

FIG. 13 is a side view illustrating the sensing device according to the second embodiment.

FIG. 14 is an enlarged view illustrating region B of FIG. 13.

FIG. 15 is a plan view illustrating the sensing device according to the second embodiment.

FIGS. 16 and 17 are side views illustrating a first collector of the sensing device according to the second embodiment.

FIGS. 18 and 19 are side views illustrating a second collector of the sensing device according to the second embodiment.

FIG. 20 is a plan view showing a path through which a magnet moves in the sensing device according to the second embodiment.

FIG. 21 is a view showing a flow of a magnetic field due to the magnet in the sensing device according to the second embodiment.

FIG. 22 is a graph showing a result of measuring a magnetic flux density using the sensing device according to the second embodiment in a state in which an external magnetic field is not introduced into the sensing device.

FIG. 23 is a graph showing a result of measuring a magnetic flux density using the sensing device according to the second embodiment in a state in which an external magnetic field is introduced into the sensing device.

MODES OF THE INVENTION

Hereinafter, exemplary embodiments of the present invention will be described in detail with reference to the accompanying drawings. However, the present invention is not limited to some embodiments which will be described and may be realized using various other embodiments, and at least one component of the embodiments may be selectively coupled, substituted.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

A sensing device according to embodiments may be installed in a steering structure of a vehicle but is not limited thereto. The sensing device can be variously applied to measure a displacement of a structure which moves linearly.

First Embodiment

FIG. 1 is a perspective view illustrating a sensing device according to a first embodiment, and FIG. 2 is a schematic view illustrating a state in which the sensing device according to the first embodiment is installed in a vehicle steering structure.

Referring to FIGS. 1 and 2, a sensing device 100 may include a magnet 110, a first collector 120, a second collector 130, a first sensor 140, and a second sensor 150. In addition, a steering structure 20 of a vehicle may include a driving member 21 and a fixing member 22.

The driving member 21 may move linearly. In addition, a position of the fixing member 22 may be fixed. In addition, the fixing member 22 may support the driving member 21. In this case, the driving member 21 may be disposed to move relative to the fixing member 22. In this case, a rack bar may be illustrated as the driving member 21. In addition, the fixing member 22 may be a rack housing surrounding one side of the rack bar but is not limited thereto.

The driving member 21 may be coupled to the magnet 110. In addition, the fixing member 22 may be coupled to the first collector 120, the second collector 130, the first sensor 140, and the second sensor 150.

The magnet 110 generates a magnetic field. The magnet 110 has an N pole and an S pole. In addition, the N pole and the S pole may be disposed in one direction. The magnet 110 may linearly move with the driving member 21. In this case, a movement direction of the magnet 110 may be perpendicular to an arrangement direction of the N pole and the S pole. For example, the arrangement direction from the N pole toward the S pole of the magnet 110 may be perpendicular to the movement direction of the magnet 110 when viewed from above. In this case, a direction parallel to the arrangement direction of the N pole and the S pole is referred to as a third direction, a direction parallel to the movement direction of the magnet 110 is referred to as a second direction, and a direction perpendicular to the third direction and the second direction is referred to as a first direction or vertical direction.

The first collector 120 and the second collector 130 are disposed to correspond to a path through which the magnet 110 moves.

In this case, since each of the first collector 120 and the second collector 130 may be formed as two members and have a gap formed therebetween. In addition, the magnet 110 is movably disposed within the gap. Accordingly, the magnet 110 may move within the gap and generate a magnetic field, and the first collector 120 and the second collector 130 may collect a magnetic flux generated by the magnet 110.

Each of the first sensor 140 and the second sensor 150 may detect an intensity of the magnetic field, that is, a magnetic flux density, collected by one of the first collector 120 and the second collector 130. The first sensor 140 and the second sensor 150 may detect a position of the magnet 110 through a difference between a magnetic flux density detected using the first collector 120 and a magnetic flux density detected using the second collector 130. In this case, the first sensor 140 and the second sensor 150 may be disposed at opposite sides with respect to the magnet 110. As illustrated in FIG. 1, the magnet 110 may be disposed between the first sensor 140 and the second sensor 150 in the second direction. For example, the first sensor 140 and the second sensor 150 may be disposed to be spaced apart from each other in the second direction. In this case, the first sensor 140 may be disposed to correspond to the first collector 120, and the second sensor 150 may be disposed to correspond to the second collector 130.

FIG. 3 is a side view illustrating the sensing device according to the first embodiment.

The magnet 110 may be divided into a first part P1 and a second part P2. As illustrated in FIG. 3, the first part P1 and the second part P2 may be disposed in the first direction. In this case, the first part P1 and the second part P2 may have the same size. For example, the first part P1 and the second part P2 may be disposed to have the same size with respect to a center of the magnet 110 in the first direction. In this case, the first part P1 may be disposed on the second part P2.

The first collector 120 and the second collector 130 may be disposed to be spaced apart from each other in the first direction.

The first collector 120 is disposed adjacent to the first part P1 of the magnet 110. In addition, the second collector 130 is disposed adjacent to the second part P2 of the magnet 110. In this case, a gap G1 between the first collector 120 and the second collector 130 may be smaller than a length L of the magnet 110 in the first direction. In this case, the length L of the magnet 110 in the first direction may be referred to as a height of the magnet 110. In addition, as illustrated in FIG. 3, a part of the first part P1 and a part of the second part P2 may be disposed within the gap G1.

Referring to FIG. 1, the first collector 120 may include a first leg part 121 and a second leg part 122. The first leg part 121 and the second leg part 122 may be disposed to be spaced apart from each other in the third direction, and the first sensor 140 may be disposed on a facing surface. In this case, a gap between the first leg part 121 and the second leg part 122 may include a region in which a size of the gap increases from the first sensor 140 toward the second sensor 150. As illustrated in FIG. 1, since the first leg part 121 and the second leg part 122 are disposed to be spaced apart from each other to have the predetermined gap in the third direction, the magnet 110 may move in the second direction between the first leg part 121 and the second leg part 122. In this case, the gap formed between the first leg part 121 and the second leg part 122 may increase away from the first sensor 140.

The second collector 130 may include a third leg part 131 and a fourth leg part 132. The third leg part 131 and the fourth leg part 132 may be disposed to be spaced apart from each other in the third direction so that the second sensor 150 may be disposed on a facing surface. In this case, a gap between the third leg part 131 and the fourth leg part 132 may include a region in which a size of the gap increases from the second sensor 150 toward the first sensor 140. As illustrated in FIG. 1, since the third leg part 131 and the fourth leg part 132 are disposed to be spaced apart from each other to have the predetermined gap in the third direction, the magnet 110 may move in the second direction between the third leg part 131 and the fourth leg part 132. In this case, the gap formed between the third leg part 131 and the fourth leg part 132 may increase away from the second sensor 150.

FIG. 4 is a plan view illustrating the first collector, the first sensor, and the magnet of the sensing device according to the first embodiment, FIG. 5 is a plan view illustrating the first leg part, the second leg part, and the first sensor of the first collector disposed in the sensing device according to the first embodiment, and FIG. 6 is an enlarged view illustrating portion A in FIG. 4. Specifically, FIG. 4 is the plan view illustrating the first collector, the first sensor, and the magnet illustrated in FIG. 3, FIG. 5 is the plan view illustrating the first leg part, the second leg part, and the first sensor illustrated in FIG. 4, and FIG. 6 is the enlarged view illustrating portion A illustrated in FIG. 4.

The first collector 120 and the second collector 130 may be formed in the same shape. In this case, the first collector 120 is disposed above the second collector 130, but when viewed from the above, the first collector 120 and the second collector 130 may be symmetrically disposed. In addition, the first sensor 140 may have the same shape and function as the second sensor 150. For the sake of convenience in the description, the first collector 120 and the first sensor 140 may be mainly described, which may be equally applied to the second collector 130 and the second sensor 150.

Referring to FIG. 4, the first leg part 121 and the second leg part 122 are disposed to face each other in the third direction. In addition, a gap 120G may be formed between the first leg part 121 and the second leg part 122.

The magnet 110 may move within the gap 120G in the second direction. In this case, a width of the gap 120G in the third direction may be greater than a width W1 of the magnet 110 in the third direction. In this case, the width of the gap 120G in the third direction may vary according to a position thereof in the second direction.

Referring to FIGS. 5 and 6, the first leg part 121 may include a 1A portion 121a, a 1B portion 121b, a 1C portion 121c, and a 1D portion 121d. In addition, the second leg part 122 may include a 2A portion 122a, a 2B portion 122b, a 2C portion 122c, and a 2D portion 122d. In this case, the 1A portion 121a and the 2A portion 122a, the 1B portion 121b and the 2B portion 122b, the 1C portion 121c and the 2C portion 122c, and the 1D portion 121d and the 2D portion 122d may be disposed to face each other with the gap 120G interposed therebetween. In this case, in the first leg part 121, the 1A portion 121a may be referred to as a first inclined portion, the 1B portion 121b may be referred to as a first body portion, the 1C portion 121c may be referred to as a first bent portion, and the 1D portion 121d may be referred to as a first facing portion. In addition, in the second leg part 122, the 2A portion 122a may be referred to as a second inclined portion, the 2B portion 122b may be referred to as a second body portion, the 2C portion 122c may be referred to as a second bent portion, and the 2D portion 122d may be referred to as a second facing portion.

A path through which the magnet 110 moves is disposed between the 1A portion 121a and 2A portion 122a. In this case, a gap formed between the 1A portion 121a and the 2A portion 122a may have a longest width G2 and a shortest width G3 in the third direction. In addition, a position of the longest width G2 may be farther than a position of the shortest width G3 from the first sensor 140. In addition, the 1A portion 121a and the 2A portion 122a may be disposed to have predetermined inclination angles ∠a and ∠b with respect to the second direction, respectively. In this case, each of the inclination angles ∠a and ∠b may be in the range of 1 to 30 degrees, preferably 1 to 15 degrees, and more preferably 1 to 10 degrees.

The 1B portion 121b and the 2B portion 122b extend from the 1A portion 121a and the 2A portion 122b, respectively. In this case, a length of each of the 1B portion 121b and the 2B portion 122b may be smaller than a length of the 1A portion 121a or the 2A portion 122a. In this case, the 1B portion 121b and the 2B portion 122b may be disposed parallel to each other in the second direction. In addition, the 1B portion 121b may be disposed between the 1A portion 121a and the 1C portion 121c. That is, the 1A portion 121a may extend from one side of the 1B portion 121b, and the 1C portion 121c may extend from the other side. In addition, the 2B portion 122b may be disposed between the 2A portion 122a and the 2C portion 122c. That is, the 2A portion 122a may extend from one side of the 2B portion 122b, and the 2C portion 122c may extend from the other side.

In addition, the 1B portion 121b and the 2B portion 122b may be disposed to have a predetermined angle ∠a' with respect to the 1A portion 121a and the 2A portion 122b, respectively. In this case, the angle La' may have an obtuse angle ranging from 150 to 179 degrees, preferably ranging from 165 to 179 degrees, and more preferably 170 to 179 degrees.

The 1C portion 121c and the 2C portion 122c extend in the third direction from the 1B portion 121b and the 2B portion 122b, respectively. In this case, a length of each of the 1C portion 121c and the 2C portion 122c may be smaller than a length of the 1B portion 121b or the 2B portion 122b.

The 1D portion 121d and the 2D portion 122d extend from the 1C portion 121c and the 2C portion 122c in the second direction, respectively. A length of each of the 1D portion 121d and the 2D portion 122d may be smaller than a length of one of the 1C portion 121c and the 2C portion 122c. In this case, the first sensor 140 is disposed on the 1D portion 121d. In addition, a gap G4 formed between the 1D portion 121d and the 2D portion 122d is smaller than the shortest width G3 formed between the 1A portion 121a and the 2A portion 122a. In addition, the gap G4 formed between the 1D portion 121d and the 2D portion 122d may be greater than a width W2 of the first sensor 140 in the third direction. Accordingly, since the first sensor 140 disposed in contact with the 1D portion 121d is disposed to be spaced apart from the 2D portion 122d, the first sensor 140 is not in contact with the 2D portion 122d.

The 1A portion 121a, the 1B portion 121b, the 1C portion 121c, and the 1D portion 121d may be formed by bending a rod member formed in a bar shape having a uniform thickness. In addition, the 2A portion 122a, the 2B portion 122b, the 2C portion 122c, and the 2D portion 122d may be formed by bending another rod member having a uniform thickness. In this case, the rod member may have a first thickness T1 and a second thickness T2 in the first direction. The first thickness T1 may be smaller than the second thickness T2. That is, in consideration of collecting a magnetic flux, the second thickness T2 may be greater than the first thickness T1. According to the embodiment, the first thickness T1 may be in the range of 0.5 mm to 1.5 mm, and the second thickness T2 may be in the range of 2.5 mm to 3.5 mm.

Meanwhile, as described above, each of the first collector 120 and the second collector 130 has a shape in which the size of the gap varies according to the position of the magnet 110. A structure of the first collector 120 and the second collector 130 may provide an effect of improving a degree of sensing accuracy of the first and second sensors 140 and 150 by minimizing magnetic leakage. Accordingly, the sensing device 100 may precisely measure the position of the magnet 110.

FIG. 7 is a plan view illustrating the sensing device according to the first embodiment.

Referring to FIG. 7, the first collector 120 and the second collector 130 have a first overlap region C1 and a second overlap region C2 in which the first collector 120 and the second collector 130 overlap in the first direction. A distance from each of the first overlap region C1 and the second overlap region C2 to the first sensor 140 may be the same as a distance from each of the first overlap region C1 and the second overlap region C2 to the second sensor 150. That is, each of the first overlap region C1 and the second overlap region C2 may be formed at a midpoint between the first sensor 140 and the second sensor 150 in the second direction.

When an imaginary straight line passing through the first and second overlap regions C1 and C2 and extending in the third direction is defined as an imaginary line CL, the first collector 120 and the second collector 130 are symmetrically disposed with respect to the imaginary line CL. In addition, the first collector 120 and the second collector 130 may be divided into a first region A1 and a second region A2 with respect to the imaginary line CL. In this case, in the first region A1, a shortest distance from the magnet 110 to the first collector 120 is smaller than a shortest distance from the magnet 110 to the second collector 130 in the third direction. In addition, in the second region A2, the shortest distance from the magnet 110 to the second collector 130 is smaller than the shortest distance from the magnet 110 to the first collector 120. Accordingly, in the first region A1, a magnetic flux density detected using the first collector 120 may be greater than a magnetic flux density detected using the second collector 130, and in the second region A2, a magnetic flux density detected using the second collector 130 may be greater than a magnetic flux density detected using the first collector 120. That is, in the first region A1, a sensing value measured by the first sensor 140 may be greater than a sensing value measured by the second sensor 150, and in the second region A2, a sensing value measured by the second sensor 150 may be greater than a sensing value measured by the first sensor 140.

FIG. 8 is a plan view showing movement of the magnet in the sensing device according to the first embodiment.

Referring to FIG. 8, the magnet 110 may move linearly in the second direction. In this case, an initial position S1 of the magnet 110 may be disposed in the middle between the first sensor 140 and the second sensor 150. In addition, when viewed from above in the vertical direction, there may be a shape in which a distance between the magnet 110 and the first collector 120 at the initial position may increase. In this case, the vertical direction may be a direction parallel to the first direction. In addition, the magnet 110 may move in a direction toward or opposite to the first sensor 140 from the initial position S1. Accordingly, the shortest distance between the magnet 110 and the first collector 130 may vary according to the position of the magnet 110 in the second direction. In this case, the shortest distance between the magnet 110 and the first collector 130 may be the distance between the magnet 110 and the first collector 130 in the third direction.

According to the embodiment with reference to FIG. 8, a shortest distance D2 between the magnet 110 and the first collector 120 at a shifted displacement position S2 may be greater than a shortest distance D1 between the magnet 110 and the first collector 120 at the initial position S1. That is, as the magnet 110 moves from the initial position S1 toward the displacement position S2, the shortest distance between the magnet 110 and the first collector 120 may increase.

Meanwhile, the shortest distance between the magnet 110 and the second collector 130 at the shifted displacement position S2 may be smaller than the shortest distance between the magnet 110 and the second collector 130 at the initial position S1. That is, as the magnet 110 moves from the initial position S1 to the displacement position S2, the shortest distance between the magnet 110 and the second collector 130 may decrease.

In this case, regardless of the position of the magnet 110 in the second direction, the sum of the shortest distance between the magnet 110 and the first collector 120 and the shortest distance between the magnet 110 and the second collector 130 may be constant.

FIG. 9 is a graph showing a result of measuring a magnetic flux density using the sensing device according to the first embodiment in a state in which an external magnetic field is not introduced into the sensing device, and FIG. 10 is a graph showing a result of measuring a magnetic flux density using the sensing device according to the first embodiment in a state in which an external magnetic field is introduced into the sensing device.

On each of the graphs, a vertical axis represents a magnetic flux density, and a horizontal axis represents a displacement of the magnet in the second direction. In this case, a magnetic flux density detected using the first collector 120 is represented by a first flux F1, and a magnetic flux density detected using the second collector 130 is represented by a second flux F2.

Referring to FIG. 9, in the sensing device 100 according to the embodiment, as the first flux F1 increases, the second flux F2 decreases. In addition, it can be seen that, as the displacement of the magnet 110 in the second direction increases, a difference (F2−F1) between the first flux F1 and the second flux F2 increases linearly. In addition, referring to FIG. 10, it can be seen that, although both the first flux F1 and the second flux F2 are offset as an external magnetic field is introduced, the difference (F2−F1) between the first flux F1 and the second flux F2 is not affected.

The sensing device according to the embodiment can minimize an influence of an external magnetic field and accurately detect a displacement of the magnet.

Second Embodiment

FIG. 11 is a perspective view illustrating a sensing device according to a second embodiment, and FIG. 12 is a schematic view illustrating a state in which the sensing device according to the second embodiment is installed in a vehicle steering structure.

When the sensing device 100 according to the first embodiment is compared with a sensing device 100a according to the second embodiment, a collector of the sensing device 100a according to the second embodiment has a different shape. Accordingly, the sensing device 100a according to the second embodiment is different from the sensing device 100 according to the first embodiment in a point that the sensing device 100a according to the second embodiment includes a facing surface of the collector disposed to face a magnet 110 and measures a position of the magnet 110 using a magnetic flux detected through an increase or decrease in width of the facing surface.

Referring to FIGS. 11 and 12, the sensing device 100a may include the magnet 110, a first collector 1120, a second collector 1130, a first sensor 140, and a second sensor 150. In addition, a steering structure 20 of a vehicle may include a driving member 21 and a fixing member 22.

The driving member 21 may move linearly. In addition, a position of the fixing member 22 may be fixed. In addition, the fixing member 22 may support the driving member 21. In this case, the driving member 21 may be disposed to move relative to the fixing member 22. In this case, a rack bar may be illustrated as the driving member 21, and the fixing member 22 may be a rack housing surrounding one side of the rack bar but is not limited thereto. In this case, the driving member 21 may be coupled to the magnet 110, and the fixing member 22 may be coupled to the first collector 1220, the second collector 1130, the first sensor 140, and the second sensor 150.

The magnet 110 generates a magnetic field. In addition, the magnet 110 has an N pole and an S pole. In addition, the N pole and the S pole may be disposed in one direction. In addition, the magnet 110 may linearly move with the driving member 21.

The first collector 1120 and the second collector 1130 are disposed to correspond to a path through which the magnet 110 moves. Since each of the first collector 1120 and the second collector 1130 may be formed as two members and have a gap formed therebetween. In addition, the magnet 110 is movably disposed within the gap.

The first collector 1120 includes a first surface 1120a which is a facing surface disposed to face the magnet 110. In this case, a width of the first surface 1120a may decrease at a predetermined rate in a direction of movement of the magnet 110. In addition, the second collector 1130 includes a second surface 1130a which is a facing surface disposed to face the magnet 110. In this case, a width of the second surface 1130a may increase at a predetermined rate in the direction of movement of the magnet 110. In this case, the magnet 110 may move within the gap and generate a magnetic field, and each of the first collector 1120 and the second collector 1130 may collect a magnetic flux generated by the magnet 110. In this case, a magnitude of the magnetic field, that is, the magnetic flux, collected by the first collector 1120 may vary according to an area of the first surface 1120a. In addition, a magnitude of the magnetic field, that is, the magnetic flux, collected by the second collector 1130 may vary according to an area of the second surface 1130a.

The first surface 1120a and the second surface 1130a are disposed to be spaced apart from the magnet 110 in a third direction. In addition, according to the direction of movement of the magnet 110, the width of each of the first surface 1120a and the second surface 1130a facing the magnet 110 may vary. The first surface 1120a may include a region of which the width decreases from one side toward the other side. Conversely, the second surface 1130a may include a region of which the width increases from one side toward the other side. For example, in one direction in which the magnet 110 moves, the width of the first surface 1120a may increase, and the width of the second surface 1130a may decrease relatively. That is, the width of the second surface 1130a may relatively decrease as much as an increase in the width of the first surface 1120a. Accordingly, even when the magnet 110 is moved and positioned at any position in a second direction, the sum of the width of the first surface 1120a disposed to face the magnet 110 and the width of the second surface 1130a disposed to face the magnet 110 may be constant.

Each of the first sensor 140 and the second sensor 150 may detect the magnitude of the magnetic field, that is, the magnetic flux density, collected by one of the first collector 1120 and the second collector 1130. The first sensor 140 and the second sensor 150 may detect the position of the magnet 110 through a difference between the magnetic flux density detected using the first collector 1120 and the magnetic flux density detected using the second collector 1130. In this case, the first sensor 140 and the second sensor 150 may be disposed at opposite sides with respect to the magnet 110. As illustrated in FIG. 11, the magnet 110 may be disposed between the first sensor 140 and the second sensor 150 in the second direction. The first sensor 140 may be disposed to correspond to the first collector 1120, and the second sensor 150 may be disposed to correspond to the second collector 1130.

FIG. 13 is a side view illustrating the sensing device according to the second embodiment, and FIG. 14 is an enlarged view illustrating region B of FIG. 13.

Referring to FIGS. 13 and 14, the magnet 110 may be divided into a first part P1 and a second part P2. The first part P1 and the second part P2 may be disposed in a first direction. In this case, the first part P1 and the second part P2 may have the same size.

The first collector 1120 and the second collector 1130 may be disposed in the first direction. The first collector 1120 may be disposed adjacent to the first part P1 of the magnet 110. For example, the first collector 1120 may be disposed around the first part P1 which is an upper end portion of the magnet 110. In this case, the first surface 1120a of the first collector 1120 may be disposed to face the first part P1. In addition, the second collector 1130 may be disposed adjacent to the second part P2 of the magnet 110. For example, the second collector 1130 may be disposed around the second part P2 which is a lower end portion of the magnet 110. The second surface 1130a of the second collector 1130 may be disposed to face the second part P2.

The first collector 1120 and the second collector 1130 may be disposed to be spaced apart from each other in the first direction. In this case, a first gap G11 may be formed between the first collector 1120 and the second collector 1130. A size of the first gap G11 may be smaller than a length (height) of the magnet 110 in the first direction. In addition, the sum T of thicknesses of the first collector 1120 and the second collector 1130 in the first direction and the size of the first gap G11 may be smaller than the length of the magnet 110 in the first direction (see FIG. 13). Accordingly, an end portion of the first part P1 and an end portion of the second part P2 may be exposed from the first collector 1120 and the second collector 1130.

FIG. 15 is a plan view illustrating the sensing device according to the second embodiment.

Referring to FIG. 15, the first collector 1120 may include a first leg part 1121 and a second leg part 1122.

The first leg part 1121 and the second leg part 1122 may be disposed to be spaced apart from each other in the third direction. A gap G12 may be formed between the first leg part 1121 and the second leg part 1122. In addition, the magnet 110 may be movably disposed within the gap G12. Accordingly, the magnet 110 may move within the gap G12 in the third direction. In this case, a width W1 of the magnet 110 may be smaller than a width of the gap G12. According to the embodiment, the width W1 of the magnet 110 in the third direction may be in the range of 15 to 25 mm. In addition, the width of the gap G12 may be in the range of 17 to 27 mm. In addition, each of the first leg part 1121 and the second leg part 1122 may include a first surface 1120a disposed to face the magnet 110. In this case, the first surface 1120a may be spaced apart from the magnet 110.

Meanwhile, the second collector 1130 may include a third leg part 1131 and a fourth leg part 1132.

The third leg part 1131 and the fourth leg part 1132 may be disposed to be spaced apart from each other in the third direction. A gap may be formed between the third leg part 1131 and the fourth leg part 1132. In addition, the magnet 110 may be movably disposed within the gap. The gap between the third leg part 1131 and the fourth leg part 1132 may be the same size as the gap between the first leg part 1121 and the second leg part 1122. In addition, each of the third leg part 1131 and the fourth leg part 1132 may include the second surface 1130a disposed to face the magnet 110. The second surface 1130a may be spaced apart from the magnet 110. Accordingly, a part of the first collector 1120 may overlap the second collector 1130 in the first direction.

FIGS. 16 and 17 are side views illustrating the first collector of the sensing device according to the second embodiment.

Referring to FIGS. 16 and 17, the first collector 1120 may include a pair of first portions 1120-1, a pair of second portions 1120-2, and a pair of third portions 1120-3. In this case, the first portions 1120-1, the second portions 1120-2, and the third portions 1120-3 may be disposed in the second direction. In addition, each of the pair of first portions 1120-1, the pair of second portions 1120-2, and the pair of third portions 1120-3 may be disposed to face each other.

The pair of first portions 1120-1 are disposed to be spaced apart from each other in the third direction. The pair of first portions 1120-1 may be disposed parallel to each other. In this case, the magnet 110 may move between the pair of first portions 1120-1. A thickness of each of the first portions 1120-1 changes according to a position thereof in the second direction. That is, a width of the first portion 1120-1 in the first direction changes according to the position in the second direction. Accordingly, the thickness of the first portion 1120-1 may change linearly. In this case, the thickness of the first portion 1120-1 of the first collector 1120 may be referred to as a first thickness, and the first collector 1120 may include a region in which the first thickness decreases from one side toward the other side.

Meanwhile, the first portion 1120-1 may have a maximum thickness T11 and a minimum thickness T12. As illustrated in FIG. 16, a thickness of an end portion of the first portion 1120-1 connected to one of the second portions 1120-2 may be the maximum thickness T11. In addition, a thickness of an end portion of the first portion 1120-1 disposed at an opposite side of the second portion 1120-2 may be the minimum thickness T12. According to the embodiment, the maximum thickness T11 may be in the range of 10 to 15 mm. In addition, the minimum thickness T12 may be in the range of 1 to 5 mm.

As the thickness of the first portion 1120-1 changes linearly, the first portion 1120-1 may include a first inclined surface 1120S. In this case, the first inclined surface 1120S may be disposed to face the second collector 1130. In addition, the first inclined surface 1120S may have a first inclination angle ∠a1 with respect to the second direction. According to the embodiment, the first inclination angle ∠a1 may be in the range of 1 to 5 degrees but is not limited thereto.

The second portion 1120-2 extends from the first portion 1120-1. The second portion 1120-2 may connect the first portion 1120-1 and one of the third portions 1120-3. A thickness of the second portion 1120-2 may be smaller than the maximum thickness T11 of the first portion 1120-1.

The third portion 1120-3 extends from the second portion 1120-2. In this case, the first sensor 140 may be disposed between the pair of third portions 1120-3. A thickness T13 of the third portion 1120-3 may be smaller than the maximum thickness T11 of the first portion 1120-1. A distance between the pair of third portions 120-2 may be smaller than a distance between the pair of first portions 1120-1. In addition, a distance between the pair of third portions 1120-3 may be greater than a width of the first sensor 140.

A length L1 of the first portion 1120-1 in the second direction may be greater than a length L2 of the second portion 1120-2 in the second direction. In addition, the length L2 of the second portion 1120-2 in the second direction may be greater than a length L3 of the third portion 1120-3 in the second direction. In this case, the length L1 of the first portion 1120-1 in the second direction may correspond to a moving distance of the magnet 110. According to the embodiment, the length L1 of the first portion 1120-1 in the second direction may be in the range of 250 to 350 mm.

FIGS. 18 and 19 are side views illustrating the second collector of the sensing device according to the second embodiment.

Referring to FIGS. 18 and 19, the second collector 1130 may be formed in the same shape as the first collector 1120.

The second collector 1130 may include a pair of fourth portions 1130-1, a pair of fifth portions 1130-2, and a pair of sixth portions 1130-3. In this case, the fourth portions 1130-1, the fifth portions 1130-2, and the sixth portions 1130-3 may be disposed in the second direction.

The pair of fourth portions 1130-1 are disposed to be spaced apart from each other in the third direction. The pair of fourth portions 1130-1 may be disposed parallel to each other. In this case, the magnet 110 may move between the pair of fourth portions 1130-1. A thickness of each of the fourth portions 1130-1 changes according to a position thereof in the second direction. That is, a width of each of the fourth portions 1130-1 in the first direction changes according to the position in the second direction. Accordingly, the thickness of the fourth portion 1130-1 may change linearly. In this case, the thickness of the fourth portion 1130-1 of the second collector 1130 may be referred to as a second thickness, and the second collector 1130 may include a region in which the second thickness increases as much as a decrease in the first thickness. Accordingly, the sum of the first thickness and the second thickness in the direction of movement of the magnet 110 is constant.

Meanwhile, the fourth portion 1130-1 may have a maximum thickness T14 and a minimum thickness T15. A thickness of an end portion of the fourth portion 1130-1 connected to one of the fifth portions 1130-2 may be the maximum thickness T14. In addition, a thickness of an end portion of the fourth portion 1130-1 disposed at an opposite side of the fifth portion 1130-2 may be the minimum thickness T15. According to the embodiment, the maximum thickness T14 may be in the range of 10 to 15 mm. In addition, the minimum thickness T15 may be in the range of 1 to 5 mm.

The fourth portion 1130-1 may include a second inclined surface 1130S. The second inclined surface 1130S may be disposed to face the first collector 1120. The second inclined surface 1130S may have a second inclination angle ∠a2 with respect to the second direction. The second inclination angle ∠a2 may be formed in an opposite direction of the first inclination angle ∠a1. The second inclination angle ∠a2 may be the same as the first inclination angle ∠a1. According to the embodiment, the second inclination angle ∠a may be in the range of 1 to 5 degrees but is not limited thereto. Referring to FIG. 14, the first inclined surface 1120S and the second inclined surface 1130S may be disposed to be spaced apart from and face each other. In this case, the first gap G11 may be disposed between the first inclined surface 1120S and the second inclined surface 1130S.

The fifth portion 1130-2 extends from each of the pair of fourth portions 1130-1. In this case, the fifth portion 1130-2 may connect the fourth portion 1130-1 and one of the sixth portions 1130-3. A thickness of the fifth portion 1130-2 may be smaller than the maximum thickness T14 of the fourth portion 1130-1.

The sixth portions 1130-3 extend from the fifth portions 1130-2. In this case, the second sensor 150 may be disposed between the pair of sixth portions 1130-3. A thickness T16 of the sixth portion 1130-3 may be smaller than the maximum thickness T14 of the fourth portion 1130-1. In addition, a distance between the pair of sixth portions 1130-3 may be smaller than a distance between the pair of fourth portions 1130-1. However, the distance between the pair of sixth portions 1130-3 may be greater than a width of the second sensor 150.

A length L4 of the fourth portion 1130-1 in the second direction may be greater than a length L5 of the fifth portion 1130-2 in the second direction. In addition, the length L5 of the fifth portion 1130-2 in the second direction may be greater than a length L6 of the sixth portion 1130-3 in the second direction. In this case, the length L4 of the fourth portion 1130-1 in the second direction may correspond to the moving distance of the magnet 110. According to the embodiment, the length L4 of the fourth portion 1130-1 in the second direction may be in the range of 250 to 350 mm.

Meanwhile, although not shown in the drawings, the first collector may be formed to include a region in which a width of the facing surface increases away from the first sensor 140. In this case, the first portion may have a shape in which the thickness increases away from the second portion. In addition, the maximum thickness of the first portion may be the thickness of the end portion disposed at the opposite side of the second portion. The minimum thickness of the first portion may be the thickness of the end portion connected to the second portion. In addition, the second collector may also be formed to include a region in which a width of the facing surface increases away from the second sensor 150 to correspond to the first collector. That is, the sensing device according to the embodiment may be changed and modified as long as having a shape in which the width of the facing surface of the first collector and the width of the facing surface of the second collector change linearly according to movement of the magnet 110. The sensing device can improve a degree of sensing accuracy by reducing magnetic leakage and an effect of an external magnetic field and reduce manufacturing costs by simplifying components.

FIG. 20 is a plan view showing a path through which the magnet moves in the sensing device according to the second embodiment.

Referring to FIG. 20, the magnet 110 moves linearly in the second direction. In this case, the magnet 110 may start to move from an initial position which is a midpoint between the first sensor 140 and the second sensor 150. In this case, the position of the magnet 110 may be determined through a difference between the position of the magnet detected using the first collector 1120 and the position of the magnet detected using the second collector 1130. For example, the first sensor 140 and the second sensor 150 may detect the position of the magnet 110 through a difference between a magnetic flux density detected using the first collector 1120 and a magnetic flux density detected using the second collector 1130.

The sensing device may be divided into a first region a1, a second region a2, and a third region a3.

The first region a1 may include a moving path of the magnet 110. In the first region a1, the first collector 1120 and the second collector 1130 may overlap in the first direction. The magnet 110 may move between a first position S11 and a second position S12.

The first position S11 may be disposed closest to the first sensor 140. In this case, the first position S11 and the first sensor 140 may be spaced apart from each other. In addition, at the first position S11, the facing surface of the first collector 1120 may have a maximum width. That is, a thickness of the first collector 1120 at the first position S11 in the first direction may be a maximum. In addition, the width of the facing surface of the first collector 1120 may decrease and the thickness of the first collector 1120 in the first direction may decrease away from the first position S11. Meanwhile, the second position S12 may be disposed closest to the second sensor 150. The second position S12 and the second sensor 150 may be disposed to be spaced apart from each other. In addition, at the second position S12, the facing surface of the second collector 1130 may have a maximum width. That is, a thickness of the second collector 1130 at the second position S12 in the first direction may be a maximum. The width of the facing surface of the second collector 1130 may decrease and the thickness of the second collector 1130 in the first direction may decrease away from the second position S12. According to the embodiment, a length of the first region a1 may be in the range of 250 to 350 mm.

The second region a2 is disposed at one side of the first region a1. The first sensor 140 is disposed in the second region a2. Only the first collector 1120 may be disposed in the second region a2. In addition, movement of the magnet 110 may be restricted in the second region a2. In this case, a length of the second region a2 may be smaller than a length of the first region a1.

The third region a3 is disposed at the other side of the first region a1. The third region a3 is disposed to be spaced apart from the second region a2 with the first region a1 interposed therebetween. The second sensor 150 is disposed in the third region a3. Only the second collector 1130 may be disposed in the third region a3. In addition, movement of the magnet 110 may be restricted in the third region a3. In this case, a length of the third region a3 may be smaller than the length of the first region a1.

The first collector 1120 and the second collector 1130 may have a first point C11 and a second point C12 in the first region a1. At the first point C11 and the second point C12, an area of the facing surface of the first collector 1120 disposed to face the magnet 110 and an area of the facing surface of the second collector 130 disposed to face the magnet 110 may be the same. That is, at a midpoint between the first sensor 140 and the second sensor 150 in the second direction, the first thickness and the second thickness may be the same. In this case, when an imaginary straight line passing through the first point C11 and the second point C12 and extending in the third direction is defined as an imaginary line CL, the first collector 1120 and the second collector 1130 are symmetrically disposed with respect to the imaginary line CL. In addition, the initial position of the magnet 110 is disposed on the imaginary line CL.

FIG. 21 is a view showing a flow of a magnetic field due to the magnet in the sensing device according to the second embodiment.

Referring to FIG. 21, in the sensing device, flows of magnetic fields are generated in different directions according to movement of the magnet 110. In this case, a first magnetic field M1 and a second magnetic field M2 may be formed in the first collector 1120 and the second collector 1130.

The first magnetic field M1 may be guided from the initial position of the magnet 110 to the first sensor 140 along the first collector 1120. In addition, the first magnetic field M1 may be further guided to the initial position of the magnet 110 from the first sensor 140 along the first collector 1120. In addition, the second magnetic field M2 may be guided from the initial position of the magnet 110 to the second sensor 150 along the second collector 1130. In addition, the second magnetic field M2 may be further guided to the initial position of the magnet 110 from the second sensor 150 along the second collector 130. In this case, the first magnetic field M1 and the second magnetic field M2 may be generated in opposite directions from the initial position of the magnet 110. For example, at the initial position, the first magnetic field M1 may be generated counterclockwise, and the second magnetic field M2 may be generated clockwise.

FIG. 22 is a graph showing a result of measuring a magnetic flux density using the sensing device according to the second embodiment in a state in which an external magnetic field is not introduced into the sensing device, and FIG. 23 is a graph showing a result of measuring a magnetic flux density using the sensing device according to the second embodiment in a state in which an external magnetic field is introduced into the sensing device.

On each of the graphs, a vertical axis may represent a magnetic flux density, and a horizontal axis may represent a displacement of the magnet. In this case, a magnetic flux density detected using the first collector 1120 is indicated by a first flux F11, and a magnetic flux density detected using the second collector 1130 is indicated by a second flux F12.

Referring to FIG. 22, in the sensing device 100a according to the embodiment, it can be seen that the magnetic flux density of the first flux F11 changes according to the displacement of the magnet and the second flux F12 changes in inverse proportion to a change value of the first flux F11. In this case, the first flux F11 and the second flux F12 may have symmetrically curved shapes with respect to a point at which the displacement of the magnet is 0. Accordingly, it can be seen that, a difference F11-F12 between the first flux F11 and the second flux F12 decreases or increases linearly according to a change of the magnet.

Meanwhile, referring to FIG. 23, although both the first flux F11 and the second flux F12 are offset as an external magnetic field is introduced, the difference (F11-F12) between the first flux F11 and the second flux F12 is not affected. The sensing device according to the embodiment can maintain linearity of a magnetic flux and more accurately detect a displacement of the magnet by improving the linearity of the magnetic flux even when an external magnetic field is applied.

The above-described embodiments have been described using examples applied to a vehicle steering structure but are not limited thereto. The present invention relates to a linear variable differential transformer (LVDT) and can be applied in various applications such as construction, facility management, household appliances, hydraulic machinery, measuring systems, aviation machinery, medical devices, production plants, inspection and test systems, and mechanical apparatuses.

REFERENCE NUMERALS

20: Vehicle Steering Structure
21: Drive Member
22: Fixing Member
110: Magnet
120, 1120: First Collector
130, 1130: Second Collector
140: First Sensor
150: Second Sensor

The invention claimed is:

1. A sensing device comprising:
a magnet;
a first collector disposed to correspond to a path through which the magnet moves;
a first sensor disposed at one side of the first collector;
a second collector disposed adjacent to the first collector; and
a second sensor disposed at one side of the second collector,
wherein
the first collector includes a first leg part and a second leg part,
each of the first leg part and the second leg part includes a facing surface disposed to face the magnet, and
each of the facing surface of the first leg part and the facing surface of the second leg part includes a region of which a width of the facing surface decreases from one side toward the other side.

2. The sensing device of claim 1, wherein:
the second collector includes a third leg part and a fourth leg part with the magnet interposed therebetween,
each of the third leg part and the fourth leg part includes a facing surface disposed to face the magnet, and
the facing surface of each of the third leg part and the fourth leg part includes a region in which a width of the facing surface increases from one side toward the other side.

3. The sensing device of claim 2, wherein:
the width of the facing surface of each of the first leg part and the second leg part decreases at a constant rate; and
the width of the facing surface of each of the third leg part and the fourth leg part increases as much as a decrease in the width of the facing surface of each of the first leg part and the second leg part.

4. The sensing device of claim 2, wherein:
the facing surface of each of the first leg part and the second leg part includes a region in which the width of the facing surface decreases from the first sensor toward the second sensor, and
the facing surface of each of the third leg part and the fourth leg part includes a region in which the width of the facing surface increases from the second sensor toward the first sensor.

5. The sensing device of claim 2, wherein:
the facing surface of each of the first leg part and the second leg part includes a region in which the width of the facing surface decreases from the first sensor toward the second sensor, and
the facing surface of each of the third leg part and the fourth leg part includes a region in which the width of the facing surface decreases from the second sensor toward the first sensor.

6. The sensing device of claim 1, wherein the first collector includes:
a pair of first portions between which the magnet moves;
a pair of third parts between which the first sensor is disposed; and
a pair of second portions connecting the pair of first portions and the pair of third portions.

7. The sensing device of claim 6, wherein:
each of the first portions has a maximum thickness and a minimum thickness, and
the maximum thickness of the first portion is greater than a thickness of each of the second portions and the third portions.

8. The sensing device of claim 6, wherein a distance between the pair of third portions is smaller than a distance between the pair of first portions.

9. The sensing device of claim 8, wherein:
the distance between the pair of first portions is greater than a width of the magnet; and
the distance between the pair of third portions is greater than a width of the first sensor.

10. The sensing device of claim 1, wherein a gap between the first leg part and the second leg part includes a region in which a size of the gap increases from one side toward the other side.

11. A sensing device comprising:
a magnet;
a first collector and a second collector disposed to correspond to a path through which the magnet moves;
a first sensor disposed on the first collector; and
a second sensor disposed on the second collector,
wherein
the first sensor and the second sensor are disposed at opposite sides with respect to the magnet,
the magnet includes a first part and a second part disposed in a first direction,
the first collector is disposed adjacent to the first part of the magnet,
the second collector is disposed adjacent to the second part of the magnet,
the first collector has a first thickness in the first direction,
the second collector has a second thickness in the first direction,
the first collector includes a region in which the first thickness decreases from one side toward the other side,
the second collector includes a region in which the second thickness increases as much as a decrease in the first thickness, and a gap between the first collector and the second collector is smaller than a height of the magnet in the first direction.

12. The sensing device of claim 11, wherein the first collector and the second collector are symmetrically disposed at one side and the other side with respect to an initial position of the magnet, respectively.

13. The sensing device of claim 11, wherein a sum of the first thickness and the second thickness in the direction of movement of the magnet is constant.

14. The sensing device of claim 13, wherein the first thickness and the second thickness are the same at a midpoint between the first sensor and the second sensor.

15. The sensing device of claim 13, wherein:
the first collector includes a first inclined surface which is formed on a surface facing the second collector and has a predetermined inclination angle with respect to a direction of movement of the magnet; and
the second collector includes a second inclined surface which faces the first inclined surface and has predetermined inclination with respect to the direction of movement of the magnet.

16. The sensing device of claim 15, wherein:
the first inclined surface has a first inclination angle with respect to the direction of movement of the magnet;
the second inclined surface has a second inclination angle with respect to the direction of movement of the magnet; and
the first inclination angle and the second inclination angle are disposed in opposite directions.

17. A sensing device comprising:
a magnet;
a first collector disposed around an upper end portion of the magnet; and
a second collector disposed around a lower end portion of the magnet,
wherein
the first collector includes a first surface facing the upper end portion of the magnet,
the second collector includes a second surface facing the lower end portion of the magnet,
a width of the first surface constantly decreases in a direction of movement of the magnet;
a width of the second surface constantly increases in the direction of movement of the magnet, and
a position of the magnet is detected through a difference between a magnetic flux density of the magnet detected by the first sensor and a magnetic flux density of the magnet detected by the second sensor.

18. The sensing device of claim 17, comprising:
a first sensor; and
a second sensor,
wherein the position of the magnet is detected through the difference between the magnetic flux density of the magnet detected by the first sensor and the magnetic flux density of the magnet detected by the second sensor.

19. The sensing device of claim 17, comprising:
a first sensor; and
a second sensor,
wherein
an initial position of the magnet is a center between the first sensor and the second sensor, and
as the magnet moves from the initial position of the magnet, the width of the first surface facing the magnet decreases constantly, and the width of the second surface facing the magnet increases constantly.

20. The sensing device of claim 19, wherein, even when the magnet moves from the initial position of the magnet, a sum of the width of the first face and the width of the second face is constant.

* * * * *